United States Patent
Ang et al.

(10) Patent No.: US 12,512,955 B2
(45) Date of Patent: Dec. 30, 2025

(54) TECHNIQUES FOR INDICATING A DYNAMIC SUBFRAME TYPE

(71) Applicant: QUALCOMM Incorporated, San Diego, CA (US)

(72) Inventors: Peter Pui Lok Ang, San Diego, CA (US); Tao Luo, San Diego, CA (US); Anurag Vardhan, San Diego, CA (US); Naga Bhushan, San Diego, CA (US); Tingfang Ji, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 18/485,954

(22) Filed: Oct. 12, 2023

(65) Prior Publication Data
US 2024/0039683 A1 Feb. 1, 2024

Related U.S. Application Data

(62) Division of application No. 15/256,325, filed on Sep. 2, 2016, now Pat. No. 11,831,584.
(Continued)

(51) Int. Cl.
*H04L 5/14* (2006.01)
*H04L 1/1812* (2023.01)
(Continued)

(52) U.S. Cl.
CPC ............ *H04L 5/14* (2013.01); *H04L 1/1812* (2013.01); *H04L 5/0055* (2013.01);
(Continued)

(58) Field of Classification Search
CPC ....... H04L 5/14; H04L 1/1812; H04L 5/0055; H04L 5/0092; H04L 5/1469;
(Continued)

(56) References Cited

U.S. PATENT DOCUMENTS

| | | | |
|---|---|---|---|
| 8,204,025 B2 * | 6/2012 | Cai | ............... H04L 27/26025 370/337 |
| 8,498,263 B2 | 7/2013 | Chun et al. | |

(Continued)

FOREIGN PATENT DOCUMENTS

| | | |
|---|---|---|
| CN | 101904125 A | 12/2010 |
| CN | 102204154 A | 9/2011 |

(Continued)

OTHER PUBLICATIONS

Catania D., et al., "The Potential of Flexible UL/DL Slot Assignment in 5G Systems", 2014 IEEE 80th Vehicular Technology Conference (VTC2014-FALL), IEEE, Sep. 14, 2014, XP032694827, pp. 1-6.

(Continued)

*Primary Examiner* — Bailor C Hsu
(74) *Attorney, Agent, or Firm* — Holland & Hart LLP

(57) ABSTRACT

Techniques are described for wireless communication. One method includes identifying a traffic condition associated with data to be transmitted between a network access device and at least one user equipment (UE); selecting, based at least in part on the traffic condition, a dynamic subframe type of a time-division duplex (TDD) subframe; and indicating the dynamic subframe type in a TDD header of the TDD subframe. Another method includes identifying, in a TDD header of a subframe, an indication of a dynamic subframe type of the TDD subframe; and transmitting data or receiving data in a data region of the TDD subframe based at least in part on the dynamic subframe type.

30 Claims, 23 Drawing Sheets

Related U.S. Application Data

(60) Provisional application No. 62/377,466, filed on Aug. 19, 2016, provisional application No. 62/267,903, filed on Dec. 15, 2015.

(51) Int. Cl.
*H04L 5/00* (2006.01)
*H04W 72/0446* (2023.01)
*H04W 72/20* (2023.01)
*H04W 72/23* (2023.01)

(52) U.S. Cl.
CPC ....... *H04L 5/0092* (2013.01); *H04W 72/0446* (2013.01); *H04W 72/20* (2023.01); *H04W 72/23* (2023.01)

(58) Field of Classification Search
CPC ... H04L 5/0044; H04L 5/0083; H04L 5/0094; H04W 72/20; H04W 72/23; H04W 72/0446; H04W 72/232
See application file for complete search history.

(56) References Cited

U.S. PATENT DOCUMENTS

| | | | |
|---|---|---|---|
| 8,514,830 B2 | 8/2013 | Lim et al. | |
| 8,542,617 B2 | 9/2013 | Choi et al. | |
| 8,605,748 B2* | 12/2013 | Park | H04L 1/1893 |
| | | | 455/69 |
| 8,780,937 B2 | 7/2014 | Lasson et al. | |
| 8,897,181 B2* | 11/2014 | Wang | H04W 72/1215 |
| | | | 370/282 |
| 9,031,010 B2 | 5/2015 | Gaal et al. | |
| 9,036,491 B2 | 5/2015 | Yin et al. | |
| 9,088,997 B2* | 7/2015 | Suzuki | H04L 5/0037 |
| 9,154,260 B2* | 10/2015 | Chen | H04L 1/008 |
| 9,155,098 B2 | 10/2015 | Geirhofer et al. | |
| 9,197,387 B2 | 11/2015 | Nory et al. | |
| 9,288,795 B2 | 3/2016 | Lee et al. | |
| 9,350,525 B2* | 5/2016 | Fu | H04W 72/20 |
| 9,438,334 B2* | 9/2016 | Ji | H04B 7/2656 |
| 9,474,060 B2* | 10/2016 | Choi | H04L 5/0091 |
| 9,525,537 B2* | 12/2016 | Sun | H04L 5/14 |
| 9,559,820 B2 | 1/2017 | Geirhofer et al. | |
| 9,629,166 B2 | 4/2017 | Wei et al. | |
| 9,668,267 B2* | 5/2017 | Lim | H04W 24/08 |
| 9,686,772 B2 | 6/2017 | Chen et al. | |
| 9,825,750 B2 | 11/2017 | Cheng et al. | |
| 10,057,861 B2* | 8/2018 | Chen | H04L 43/08 |
| 10,389,501 B2* | 8/2019 | Yi | H04W 16/14 |
| 10,524,237 B2* | 12/2019 | Nam | H04W 72/23 |
| 11,122,580 B2 | 9/2021 | Xiong et al. | |
| 2010/0254367 A1 | 10/2010 | Lim et al. | |
| 2011/0038285 A1 | 2/2011 | Kwon et al. | |
| 2011/0235602 A1 | 9/2011 | Ji et al. | |
| 2011/0310837 A1 | 12/2011 | Classon et al. | |
| 2013/0039193 A1 | 2/2013 | Yin et al. | |
| 2013/0194982 A1 | 8/2013 | Fwu et al. | |
| 2013/0223356 A1 | 8/2013 | Khoshevis et al. | |
| 2013/0235821 A1 | 9/2013 | Chen et al. | |
| 2013/0301570 A1 | 11/2013 | Xu et al. | |
| 2014/0029486 A1 | 1/2014 | Li et al. | |
| 2014/0092788 A1 | 4/2014 | Ji et al. | |
| 2014/0198733 A1 | 7/2014 | Yin et al. | |
| 2014/0204807 A1 | 7/2014 | Li et al. | |
| 2014/0307598 A1 | 10/2014 | Mizusawa et al. | |
| 2015/0016376 A1 | 1/2015 | Seo | |
| 2015/0030090 A1 | 1/2015 | You et al. | |
| 2015/0043434 A1* | 2/2015 | Yamada | H04W 72/0446 |
| | | | 370/329 |
| 2015/0085840 A1* | 3/2015 | Liu | H04L 5/0055 |
| | | | 370/336 |
| 2015/0124663 A1 | 5/2015 | Chen et al. | |
| 2015/0188690 A1 | 7/2015 | Khoryaev et al. | |
| 2015/0195849 A1* | 7/2015 | Bashar | H04L 5/0092 |
| | | | 370/330 |
| 2016/0057758 A1 | 2/2016 | Ouchi et al. | |
| 2016/0066288 A1 | 3/2016 | Feng et al. | |
| 2016/0066304 A1 | 3/2016 | Ji et al. | |
| 2016/0143044 A1 | 5/2016 | Suzuki et al. | |
| 2016/0278089 A1* | 9/2016 | Lee | H04W 72/23 |
| 2016/0329993 A1 | 11/2016 | Kim et al. | |
| 2017/0019915 A1* | 1/2017 | Nogami | H04L 5/0053 |
| 2017/0170944 A1 | 6/2017 | Ang et al. | |
| 2017/0202007 A1 | 7/2017 | Miao et al. | |
| 2018/0124815 A1 | 5/2018 | Papasakellariou | |
| 2018/0219649 A1 | 8/2018 | Ying et al. | |
| 2019/0109694 A1 | 4/2019 | Zhou et al. | |
| 2019/0254053 A1 | 8/2019 | Ying et al. | |
| 2021/0392679 A1 | 12/2021 | Kim et al. | |

FOREIGN PATENT DOCUMENTS

| | | |
|---|---|---|
| CN | 102594436 A | 7/2012 |
| CN | 103430468 A | 12/2013 |
| JP | 2018529277 A | 10/2018 |
| KR | 20090079151 A | 7/2009 |
| KR | 20110028233 A | 3/2011 |
| KR | 20110049638 A | 5/2011 |
| WO | WO2012112281 A2 | 8/2012 |
| WO | WO2013090453 | 6/2013 |
| WO | WO2013148347 A1 | 10/2013 |
| WO | WO2013170093 | 11/2013 |
| WO | WO2014022209 | 2/2014 |
| WO | WO2014052645 A1 | 4/2014 |
| WO | WO2015069054 A1 | 5/2015 |

OTHER PUBLICATIONS

Ericsson: "5G—Key Component of the Networked Society," 3GPP RAN Workshop on 5G, RWS-150009, Phoenix, AZ, USA, Sep. 17-18, 2015, 55 pgs., XP051043759, 3rd Generation D Partnership Project, Sophia-Antipolis Cedex, France, Retrieved from the Internet: URL:http://www.3gpp.org/ftp/workshop/2015-09-17_18_RAN_5G/Docs/">http://www.3gpp.org/ftp/workshop/2015-09-17_18_RAN_5G/Docs/ [retrieved on Aug. 3, 2017], Slides 5, 33-34.

International Preliminary Report on Patentability—PCT/US2016/065744, The International Bureau of WIPO—Geneva, Switzerland, Apr. 10, 2018.

International Search Report and Written Opinion—PCT/US2016/065744—ISA/EPO—Feb. 10, 2017.

IPEA/EP, Second Written Opinion of the International Preliminary Examining Authority, Int'l Application No. PCT/US2016/065744, Nov. 9, 2017, European Patent Office, Rijswijk, NL, 9 pgs.

Levanen T.A., et al., "Radio Interface Evolution Towards 5G and Enhanced Local Area Communications", IEEE Access, vol. 2, Sep. 17, 2014 (Sep. 17, 2014), pp. 1005-1029, XP011559830, DOI: 10.1109/ACCESS.2014.2355415, https://ieeexplore.ieee.org/stamp/stamp.jsp?tp=&arnumber=6891105"title="Link: https://ieeexplore.ieee.org/stamp/stamp.jsp?tp=&arnumber=6891105">https://ieeexplore.ieee.org/stamp/stamp.jsp?tp=&arnumber=6891105, Section V; figures 2,4, tables 8,12, Section VI.A; figure 5., figure 2, table 12.

Nokia et al., "Remaining Details for Enhanced UL Power Control for TDD elMTA", 3GPP Draft, R1-135558, Nov. 13, 2013, XP050735223, Retrieved from the Internet: URL:http://www.3gpp.org/ftp/Meetings_3GPP_SYNC/RAN/RAN1/Docs" title="Link: http://www.3gpp.org/ftp/Meetings_3GPP_SYNC/RAN/RAN1/Docs">http://www.3gpp.org/ftp/Meetings_3GPP_SYNC/RAN/RAN1/Docs, 3 pages.

Qualcomm Incorporated: "Adaptive Frame Structure and DL-UL Configuration for LAA", 3GPP TSG RAN WG1 #82bis, R1-155728, Oct. 5-9, 2015, Malmo, Sweden, pp. 1-3, URL: http://www.3gpp.org/ftp/tsg_ran/WG1_RL1/TSGR1_82b/Docs/R1-155728.zip" title="Link: http://www.3gpp.org/ftp/iso ran/WG1 RL1/TSGR1 82b/Docs/R1-155728.zip">http://www.3gpo.org/ftp/tsg ran/WG1 RL1/TSGR1 82b/Docs/R1-155728.zip.

Qualcomm Technologies: "Making 5G NR a Reality", Leading the Technology Inventions for a Unified, more Capable 5G air Interface, Dec. 2016, 30 Pages, XP055360375, Retrieved from the Internet:

(56) References Cited

OTHER PUBLICATIONS

URL: https://www.qualcomm.com/documents/whitepaper-making-5g-nr-reality">https://www.qualcomm.com/documents/whitepaper-making-5g-nr-reality [Retrieved on Mar. 30. 2017].
Taiwan Search Report—TW105139856—TIPO—Apr. 14, 2020.
Taiwan Search Report—TW105139856—TIPO—Jul. 24, 2020.

* cited by examiner

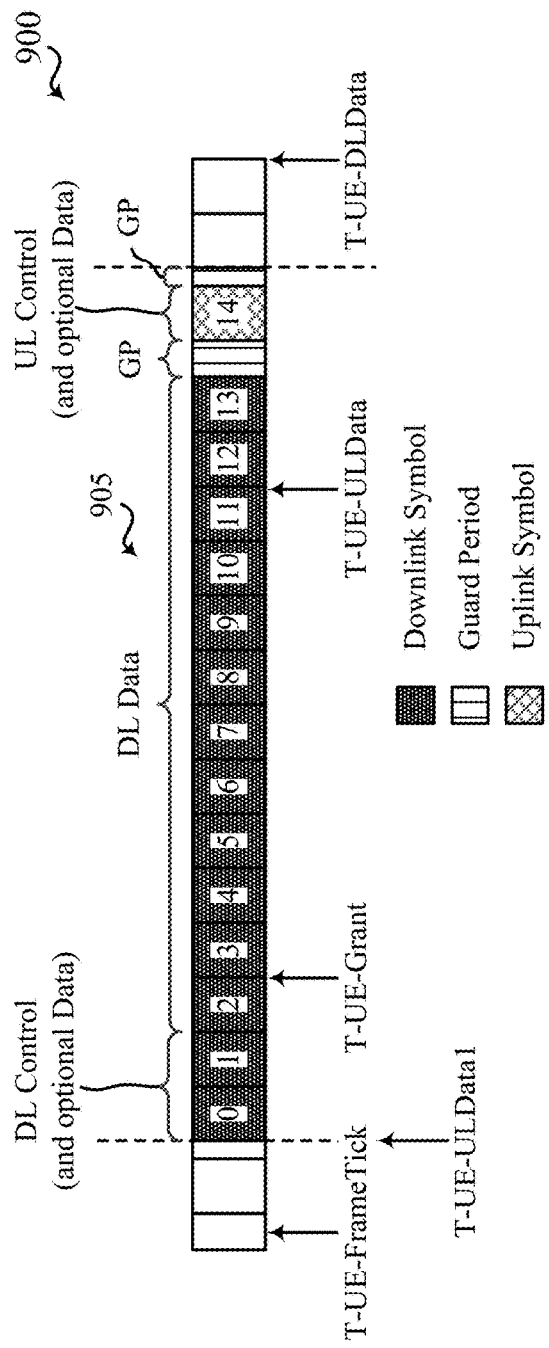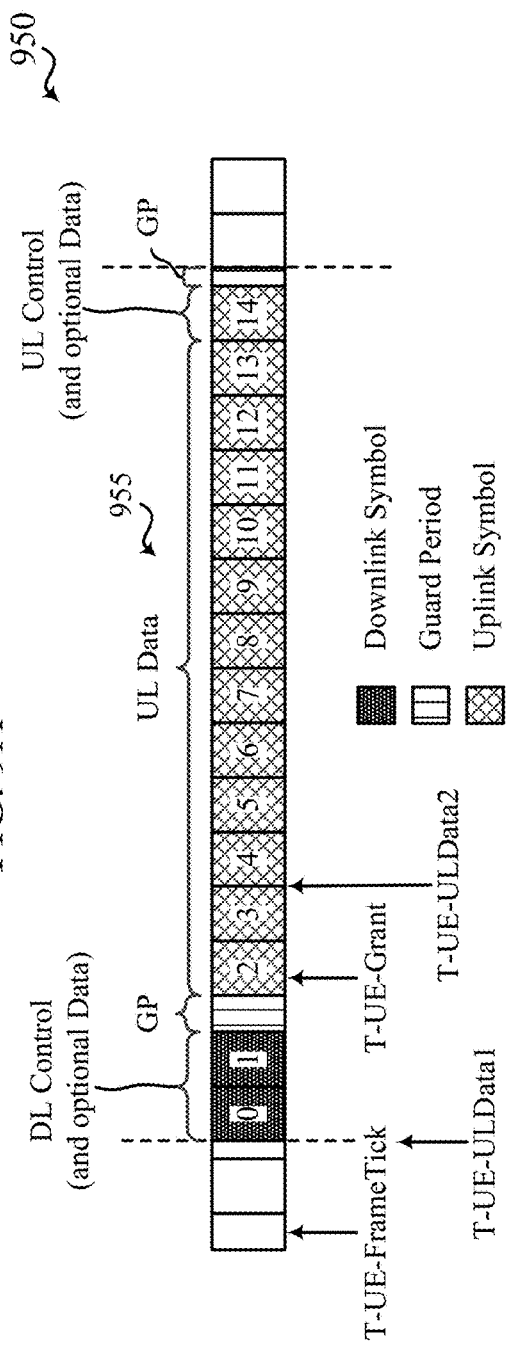
FIG. 9A
FIG. 9B

TECHNIQUES FOR INDICATING A DYNAMIC SUBFRAME TYPE

CROSS REFERENCES

The present Application for Patent is a Divisional of U.S. patent application Ser. No. 15/256,325 by ANG et al. entitled "Techniques For Indicating A Dynamic Subframe Type" filed Sep. 2, 2016, which claims priority to U.S. Provisional Patent Application No. 62/267,903 by Ang et al., entitled "Techniques for Dynamically Indicating a Time-Division Duplex (TDD) Subframe Type," filed Dec. 15, 2015 and U.S. Provisional Patent Application No. 62/377, 466 by Ang et al., entitled "Techniques for Dynamically Indicating a Time-Division Duplex (TDD) Subframe Type," filed Aug. 19, 2016, each of which is assigned to the assignee hereof, and each of which are hereby expressly incorporated by reference herein in their entirety.

INTRODUCTION

The present disclosure, for example, relates to wireless communication systems, and more particularly to techniques for dynamically indicating a dynamic subframe type.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

In some examples, a wireless multiple-access communication system may include a number of base stations, each simultaneously supporting communication for multiple communication devices, otherwise known as user equipment (UEs). In a Long-Term Evolution (LTE) or LTE-Advanced (LTE-A) network, a set of one or more base stations may define an eNodeB (eNB). In other examples (e.g., in a next generation or 5G network), a wireless multiple access communication system may include a number of smart radio heads (RHs) in communication with a number of access node controllers (ANCs), where a set of one or more RHs, in communication with an ANC, defines an eNB. A base station or RH may communicate with a set of UEs on downlink (DL) channels (e.g., for transmissions from a base station or RH to a UE) and uplink (UL) channels (e.g., for transmissions from a UE to a base station or RH).

Subframes of communication between a network access device (e.g., an eNB, an ANC, a RH, or a base station) and a plurality of UEs may include different regions or channels that are assembled in accordance with a time division duplex (TDD) and/or frequency division duplex (FDD) subframe structure. Subframes may also include arrangements of UL channels and/or DL channels. In LTE/LTE-A networks, the data transmission direction of a subframe (e.g., UL and/or DL) is pre-determined or fixed.

SUMMARY

A method of wireless communication is described. The method may include selecting a dynamic subframe type of a TDD subframe and indicating the dynamic subframe type in a TDD header of the TDD subframe.

An apparatus for wireless communication is described. The apparatus may include means for selecting a dynamic subframe type of a TDD subframe and means for indicating the dynamic subframe type in a TDD header of the TDD subframe.

Another apparatus for wireless communication is described. The apparatus may include a processor, memory in electronic communication with the processor, and instructions stored in the memory. The instructions may be operable to cause the processor to select a dynamic subframe type of a TDD subframe and indicate the dynamic subframe type in a TDD header of the TDD subframe.

A non-transitory computer readable medium for wireless communication is described. The non-transitory computer-readable medium may include instructions operable to cause a processor to select a dynamic subframe type of a TDD subframe and indicate the dynamic subframe type in a TDD header of the TDD subframe.

In some examples of the method, apparatus, and non-transitory computer-readable medium described above, the dynamic subframe type may be indicated within a temporally first symbol period of the TDD subframe.

Some examples of the method, apparatus, and non-transitory computer-readable medium described above may further include processes, features, means, or instructions for transmitting a downlink control region of the TDD header within at least one of: the temporally first symbol period of the TDD subframe, or the temporally first symbol period of the TDD subframe and a temporally second symbol period of the TDD subframe.

In some examples of the method, apparatus, and non-transitory computer-readable medium described above, the dynamic subframe type may be selected from a set of dynamic subframe types including two or more of: a downlink-centric dynamic subframe type, or an uplink-centric dynamic subframe type, or a bi-directional dynamic subframe type, or a full-duplex dynamic subframe type, or a dynamic switch dynamic subframe type, or a mixed interference measurement dynamic subframe type, or a distributed scheduling dynamic subframe type.

Some examples of the method, apparatus, and non-transitory computer-readable medium described above may further include processes, features, means, or instructions for at least one of: allocating a hybrid automatic repeat request (HARQ) transmission period for the TDD subframe at an end of the TDD subframe, or allocating at least one HARQ transmission resource for the TDD subframe in a downlink control region of a subsequent subframe, or allocating at least one downlink HARQ transmission resource for the TDD subframe and at least one uplink HARQ transmission resource for the TDD subframe in the TDD subframe.

Some examples of the method, apparatus, and non-transitory computer-readable medium described above may further include processes, features, means, or instructions for at least one of: broadcasting the dynamic subframe type to UEs associated with a cell, or unicasting the dynamic subframe type to a subset of UEs associated with the cell. Some examples of the method, apparatus, and non-transitory computer-readable medium described above may further include processes, features, means, or instructions for scheduling a data region of the TDD subframe based at least in part on the selected dynamic subframe type.

Some examples of the method, apparatus, and non-transitory computer-readable medium described above may further include processes, features, means, or instructions for indicating the dynamic subframe type in a downlink control region of the TDD subframe. Some examples of the method, apparatus, and non-transitory computer-readable medium described above may further include processes, features, means, or instructions for scheduling a guard period between the downlink control region and the data region when the dynamic subframe type may be associated with a data region having an uplink portion.

In some examples of the method, apparatus, and non-transitory computer-readable medium described above, indicating the dynamic subframe type comprises: transmitting an indication of the dynamic subframe type within a narrow band of frequencies of a system bandwidth. In some examples of the method, apparatus, and non-transitory computer-readable medium described above, indicating the dynamic subframe type comprises: transmitting at least one of: a first bit indicating an uplink data transmission direction or a downlink data transmission direction, or a second bit indicating a half-duplex data transmission or a full-duplex data transmission, or a combination thereof.

Some examples of the method, apparatus, and non-transitory computer-readable medium described above may further include processes, features, means, or instructions for indicating the dynamic subframe type comprises at least one of: embedding an indication of the dynamic subframe type in a reference signal, or transmitting the indication of the dynamic subframe type in a subframe type indicator channel, or transmitting a type of downlink control information (DCI) corresponding to the dynamic subframe type.

Some examples of the method, apparatus, and non-transitory computer-readable medium described above may further include processes, features, means, or instructions for identifying a traffic condition associated with data to be transmitted between a network access device and at least one UE, the traffic condition comprising an uplink/downlink traffic ratio.

In some examples of the method, apparatus, and non-transitory computer-readable medium described above, the dynamic subframe type may be selected based at least in part on the traffic condition. In some examples of the method, apparatus, and non-transitory computer-readable medium described above, the uplink/downlink traffic ratio comprises a ratio of traffic queued for transmission to the network access device and traffic queued for transmission to the at least one UE.

A method of wireless communication is described. The method may include identifying, in a TDD header of a TDD subframe, an indication of a dynamic subframe type of the TDD subframe and transmitting data or receiving data in a data region of the TDD subframe based at least in part on the dynamic subframe type.

An apparatus for wireless communication is described. The apparatus may include means for identifying, in a TDD header of a TDD subframe, an indication of a dynamic subframe type of the TDD subframe and means for transmitting data or receiving data in a data region of the TDD subframe based at least in part on the dynamic subframe type.

Another apparatus for wireless communication is described. The apparatus may include a processor, memory in electronic communication with the processor, and instructions stored in the memory. The instructions may be operable to cause the processor to identify, in a TDD header of a TDD subframe, an indication of a dynamic subframe type of the TDD subframe and transmit data or receiving data in a data region of the TDD subframe based at least in part on the dynamic subframe type.

A non-transitory computer readable medium for wireless communication is described. The non-transitory computer-readable medium may include instructions operable to cause a processor to identify, in a TDD header of a TDD subframe, an indication of a dynamic subframe type of the TDD subframe and transmit data or receiving data in a data region of the TDD subframe based at least in part on the dynamic subframe type.

In some examples of the method, apparatus, and non-transitory computer-readable medium described above, the dynamic subframe type may be identified within a temporally first symbol period of the TDD subframe. Some examples of the method, apparatus, and non-transitory computer-readable medium described above may further include processes, features, means, or instructions for receiving a downlink control region of the TDD header within at least one of: the temporally first symbol period of the TDD subframe, or the temporally first symbol period of the TDD subframe and a temporally second symbol period of the TDD subframe.

In some examples of the method, apparatus, and non-transitory computer-readable medium described above, the dynamic subframe type comprises: a downlink-centric dynamic subframe type, or an uplink-centric dynamic subframe type, or a bi-directional dynamic subframe type, or a full-duplex dynamic subframe type, or a dynamic switch dynamic subframe type, or a mixed interference measurement dynamic subframe type, or a distributed scheduling dynamic subframe type.

Some examples of the method, apparatus, and non-transitory computer-readable medium described above may further include processes, features, means, or instructions for identifying at least one of: an allocation of a HARQ transmission period for the TDD subframe at an end of the TDD subframe, or an allocation of at least one HARQ transmission resource for the TDD subframe in a downlink control region of a subsequent subframe, or an allocation of at least one downlink HARQ transmission resource for the TDD subframe and at least one uplink HARQ transmission resource for the TDD subframe in the TDD subframe.

In some examples of the method, apparatus, and non-transitory computer-readable medium described above, the dynamic subframe type may be received in at least one of: broadcast control information, or unicast control information. Some examples of the method, apparatus, and non-transitory computer-readable medium described above may further include processes, features, means, or instructions for identifying the dynamic subframe type in a downlink control region of the TDD subframe. Some examples of the method, apparatus, and non-transitory computer-readable medium described above may further include processes, features, means, or instructions for refraining from transmitting during a guard period between the downlink control region and the data region when the dynamic subframe type may be associated with a data region having an uplink portion.

In some examples of the method, apparatus, and non-transitory computer-readable medium described above, identifying the dynamic subframe type comprises: identifying an indication of the dynamic subframe type within a narrow band of frequencies of a system bandwidth. In some examples of the method, apparatus, and non-transitory computer-readable medium described above, wherein identifying the dynamic subframe type comprises: receiving at least one of: a first bit indicating an uplink data transmission direction or a downlink data transmission direction, or a second bit indicating a half-duplex data transmission or a full-duplex data transmission, or a combination thereof.

In some examples of the method, apparatus, and non-transitory computer-readable medium described above, the dynamic subframe type may be identified based at least in part on at least one of: an indication of the dynamic subframe type embedded in a reference signal, or an indication of the dynamic subframe type received in a subframe type indicator channel, or a type of received DCI.

BRIEF DESCRIPTION OF THE DRAWINGS

A further understanding of the nature and advantages of the present disclosure may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 9A shows an example timeline of operations performed by a UE for a subframe associated with a DL-centric dynamic subframe type, in accordance with one or more aspects of the present disclosure;

FIG. 9B shows an example timeline of operations performed by a UE for a subframe associated with a UL-centric dynamic subframe type, in accordance with one or more aspects of the present disclosure;

DETAILED DESCRIPTION

Figure 1:
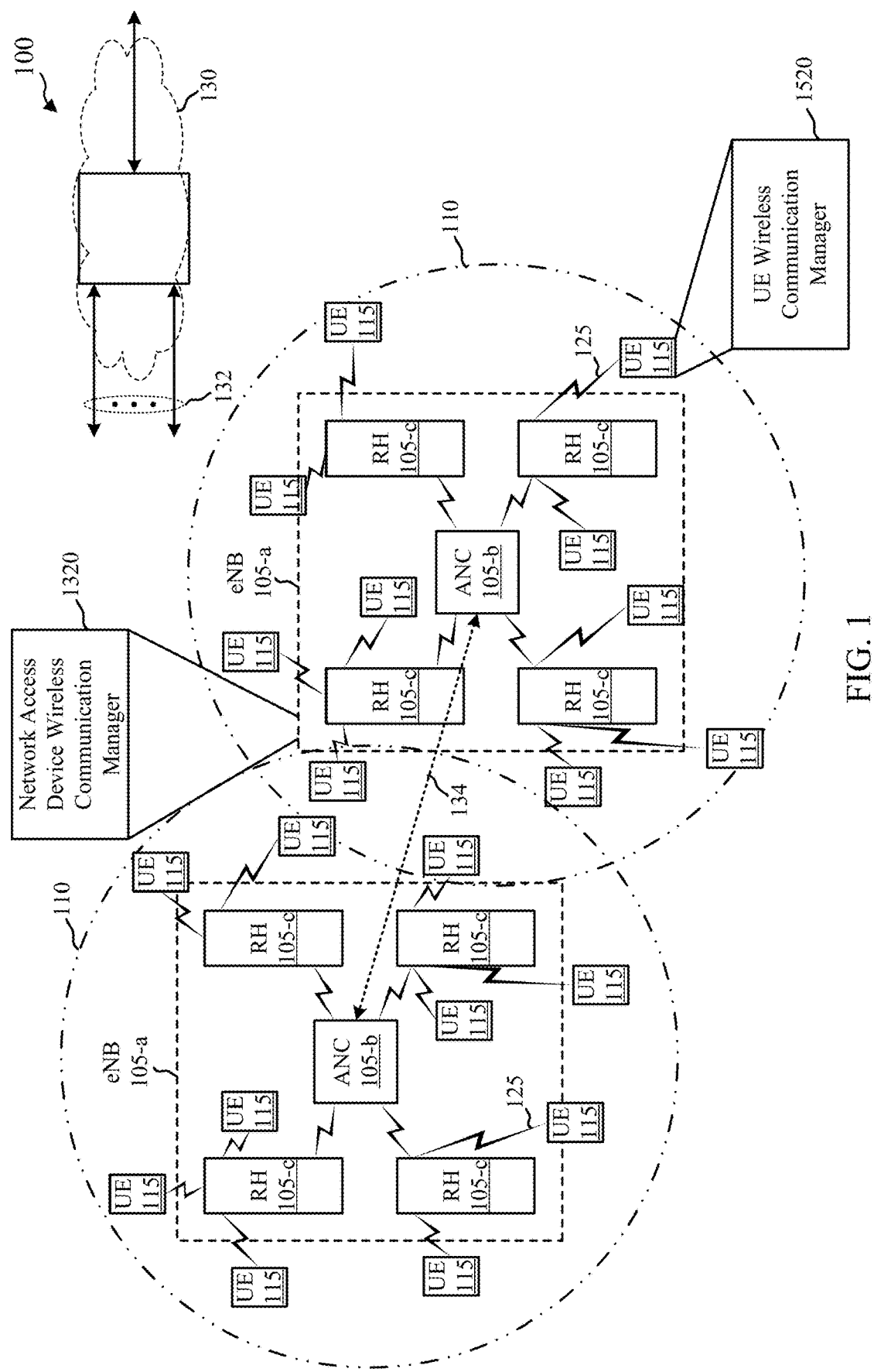
FIG. 1 illustrates an example of a wireless communication system, in accordance with one or more aspects of the disclosure.

Techniques are described in which dynamic subframe types are indicated for a TDD subframe. Next generation networks (e.g., 5G networks) are being designed to support features such as high bandwidth operations, more dynamic subframe types, and self-contained subframe types (in which HARQ feedback for a subframe may be transmitted before the end of the subframe). Techniques for structuring subframes for LTE/LTE-A communications may not be adequate for next generation (or 5G) networks. For example, the high and frequently changing traffic loads that a 5G network is expected to serve may not be efficiently serviced by a pre-determined or fixed subframe structure. Thus, support for dynamic selection and indication of a subframe type may be necessary to support high and frequently changing traffic loads.

A network access device (e.g., an eNB, an ANC, an RH, or a base station) may identify a traffic condition (e.g., a UL/DL traffic ratio) associated with data to be transmitted between the network access device and at least one UE. The UL/DL traffic ratio may be a ratio of traffic queued for transmission to the network access device and traffic queued for transmission to the at least one UE. Based at least in part on the traffic condition, a dynamic subframe type may be selected for an upcoming (e.g., next) subframe. The selected dynamic subframe type may, for example, be selected from a set of dynamic subframe types, such as downlink-centric, uplink-centric, bi-directional, full-duplex, dynamic switch, mixed interference measurement, and distributed scheduling dynamic subframe types. The selected dynamic subframe type may be indicated to one or more UEs in a TDD header of a TDD subframe. In this manner, the TDD subframe for which the dynamic subframe type is selected may be self-contained (e.g., all control information pertaining to the TDD subframe, including HARQ feedback for the TDD subframe, may be transmitted within the TDD subframe).

In some cases, to support multiplexing of different classes of users and requirements, some attributes of a subframe may change dynamically. As an example, subframe numerology, which defines the tone spacing, cyclic prefix duration, symbol duration, a number of transmission time intervals (TTIs) within a subframe, a number of symbols per TTI, the presence of a common UL burst and associated attributes, a duration of a guard period, a frequency domain partition of the subframe (i.e., subbanding), etc., may dynamically change in a wireless communications system. Additionally or alternatively, subframes with different attributes may be classified as different dynamic subframe types and be dynamically selected for use.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various operations may be added, omitted, or combined. Additionally or alternatively, features described with respect to some examples may be combined in some other examples.

FIG. 1 illustrates an example of a wireless communication system 100, in accordance with one or more aspects of the disclosure. The wireless communication system 100 may include network access devices 105, UEs 115, and a core network 130. The core network 130 may provide user authentication, access authorization, tracking, Internet Protocol (IP) connectivity, and other access, routing, or mobility functions. At least some of the network access devices 105 (e.g., eNBs 105-a or ANCs 105-b) may interface with the core network 130 through backhaul links 132 (e.g., S1, S2, etc.) and may perform radio configuration and scheduling for communication with the UEs 115. In various examples, the ANCs 105-b may communicate, either directly or indirectly (e.g., through core network 130), with each other over backhaul links 134 (e.g., X1, X2, etc.), which may be wired or wireless communication links. Each ANC 105-b may also communicate with a number of UEs 115 through a number of smart RHs 105-c. In an alternative configuration of the wireless communication system 100, the functionality of an ANC 105-b may be provided by a RH 105-c or distributed across the RHs 105-c of an eNB 105-a. In another alternative configuration of the wireless communication system 100, the RHs 105-c may be replaced with base stations, and the ANCs 105—may be replaced by base station controllers (or links to the core network 130).

A macro cell may cover a relatively large geographic area (e.g., several kilometers in radius) and may allow unrestricted access by UEs 115 with service subscriptions with a network provider. A small cell may include a lower-powered RH or base station, as compared with a macro cell, and may operate in the same or different frequency band(s) as macro cells. Small cells may include pico cells, femto cells, and micro cells according to various examples. A pico cell may cover a relatively smaller geographic area and may allow unrestricted access by UEs 115 with service subscriptions with a network provider. A femto cell also may cover a relatively small geographic area (e.g., a home) and may provide restricted access by UEs 115 having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the eNBs 105-a and/or RHs 105-c may have similar frame timing, and transmissions from different eNBs 105-a and/or RHs 105-c may be approximately aligned in time. For asynchronous operation, the eNBs 105-a and/or RHs 105-c may have different frame timings, and transmissions from different eNBs 105-a and/or RHs 105-c may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or packet data convergence protocol (PDCP) layer may be IP-based. A radio link control (RLC) layer may in some cases perform packet segmentation and reassembly to communicate over logical channels. A medium access control (MAC) layer may perform priority handling and multiplexing of logical channels into transport channels. The MAC layer may also use HARQ to provide retransmission at the MAC layer to improve link efficiency. In the control plane, the radio resource control (RRC) protocol layer may provide establishment, configuration, and maintenance of an RRC connection between a UE 115 and a RH 105-c, ANC 105-b, or core network 130 supporting radio bearers for user plane data. At the physical (PHY) layer, transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an Internet of Everything (IoE) device, or the like. A UE may be able to communicate with various types of eNBs 105-a, RHs 105-c, base stations, access points, or other network access devices, including macro eNBs, small cell eNBs, relay base stations, and the like. A UE may also be able to communicate directly with other UEs (e.g., using a peer-to-peer (P2P) protocol).

The communication links 125 shown in wireless communication system 100 may include UL channels from a UE 115 to a RH 105-c, and/or DL channels, from a RH 105-c to a UE 115. The DL channels may also be called forward link channels, while the UL channels may also be called reverse link channels. Control information and data may be multiplexed on a UL channel or DL channel according to various techniques. Control information and data may be multiplexed on a DL channel, for example, using time-division multiplexing (TDM) techniques (e.g., as described with reference to FIG. 2), frequency-division multiplexing (FDM) techniques (e.g., as described with reference to FIG. 3), or hybrid TDM-FDM techniques (e.g., as described with reference to FIG. 7, 8, or 9). In some examples, the control information transmitted during a TTI of a DL channel may be distributed between different control regions in a cascaded manner (e.g., between a common control region and one or more UE-specific control regions).

One or more of the network access devices 105 (e.g., one or more eNBs 105-a) may include a network access device wireless communication manager 1320. In some examples, the network access device wireless communication manager 1320 may be an example of the wireless communication manager 1320 described with reference to FIG. 13, 14, or 17, and may be used to identify a traffic condition associated with data to be transmitted between a network access device and at least one UE 115. The network access device wireless communication manager 1320 may also be used to select, based at least in part on the traffic condition, a dynamic subframe type of a subframe, and to indicate the dynamic subframe type in a TDD header of the TDD subframe.

One or more of the UEs 115 may include a UE wireless communication manager 1520. In some examples, the UE wireless communication manager 1520 may be an example of the wireless communication manager 1520 described with reference to FIG. 15, 16, or 18, and may be used to identify, in a TDD header of a subframe, an indication of a dynamic subframe type of the TDD subframe. The UE wireless communication manager 1520 may also be used to transmit data or receive data in a data region of the TDD subframe based at least in part on the dynamic subframe type.

Each communication link 125 may include one or more carriers, where each carrier may be a signal made up of multiple sub-carriers (e.g., waveform signals of different frequencies) modulated according to one or more radio access technologies. Each modulated signal may be sent on a different sub-carrier and may carry control information (e.g., reference signals, control channels, etc.), overhead information, user data, etc. The communication links 125 may transmit bidirectional communications using FDD techniques (e.g., using paired spectrum resources) or TDD techniques (e.g., using unpaired spectrum resources). Frame structures for FDD (e.g., frame structure type 1) and TDD (e.g., frame structure type 2) may be defined.

In some examples of the wireless communication system 100, the RHs 105-c and/or UEs 115 may include multiple antennas for employing antenna diversity schemes to improve communication quality and reliability between RHs 105-c and UEs 115. Additionally or alternatively, RHs 105-c and/or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple DL CCs and one or more UL CCs CA. CA may be used with both FDD and TDD CCs.

Figure 2A:
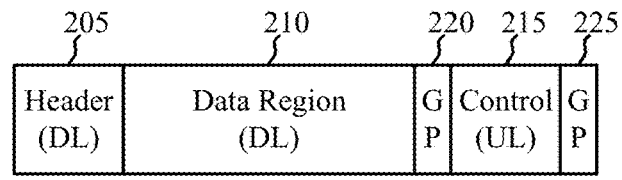
FIG. 2A shows an example of a subframe associated with a DL-centric dynamic subframe type, in accordance with one or more aspects of the present disclosure.
Figure 2B:
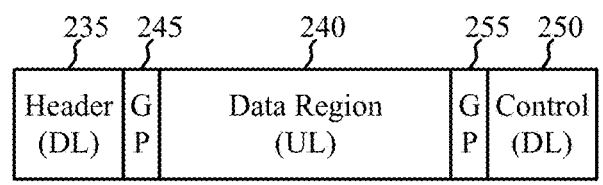
FIG. 2B shows an example of a subframe associated with a UL-centric dynamic subframe type, in accordance with one or more aspects of the present disclosure.
Figure 2C:
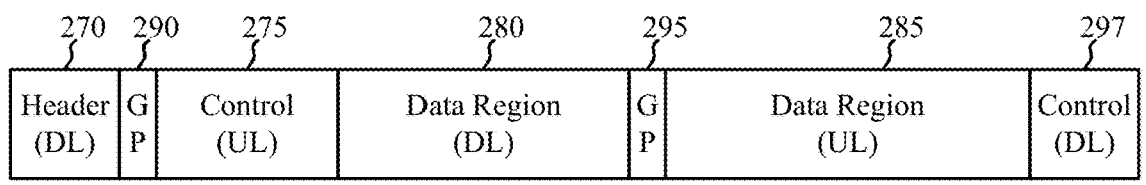
FIG. 2C shows an example of a subframe associated with a bi-directional dynamic subframe type, in accordance with one or more aspects of the present disclosure.

FIGS. 2A, 2B, and 2C show various examples of dynamic subframe types. The dynamic subframe types illustrated in FIGS. 2A, 2B, and 2C may be examples of subframe types selected for a TDD subframe. FIG. 2A shows an example of a subframe 200 associated with a DL-centric dynamic subframe type, in accordance with one or more aspects of the present disclosure. In some examples, the DL-centric dynamic subframe type may be selected for the subframe 200, by a network access device, based at least in part on a UL/DL traffic ratio. For example, the network access device may select a DL-centric dynamic subframe type for the subframe 200 when the UL/DL traffic ratio that indicates more traffic is queued by the network access device for transmission to one or more UEs than is queued by the one or more UEs for transmission to the network access device. Alternatively, and by way of further example, the network access device may select a DL-centric dynamic subframe type for the subframe 200 when the UL/DL ratio indicates a particular percentage of the total amount of traffic queued for one or more UEs is DL traffic, or when a particular percentage of the DL traffic included in the UL/DL ratio is associated with a priority above a threshold. In some examples, the network access device and UEs that communicate in the subframe 200 may be examples of aspects of the network access devices 105 and UEs 115 described with reference to FIG. 1.

The subframe 200 may begin with a header 205 including a DL control region. An indication of the DL-centric dynamic subframe type of the subframe 200 may be transmitted to one or more UEs that transmit or receive data during the subframe 200, by the network access device, in the header 205 (and/or in the DL control region). Following the header 205, the network access device may schedule a data region 210 of the subframe 200 (e.g., a DL data region). Following the data region 210, the network access device may schedule a UL control region 215 and/or allocate at least one HARQ transmission resource for a UE (or UEs) to transmit HARQ feedback for the subframe 200 (e.g., one or more positive acknowledgments (ACKs) or negative acknowledgments (NACKs)) to the network access device. The UL control region 215 and/or at least one HARQ transmission resource may be optionally bounded by a first guard period 220 and a second guard period 225 in the time domain, to give UEs time to perform RF switching. In some examples, the subframe 200 may have a self-contained subframe structure (e.g., a subframe structure in which all transmissions during the subframe are ACK'd or NAK'd during the subframe).

FIG. 2B shows an example of a subframe 230 associated with a UL-centric dynamic subframe type, in accordance with one or more aspects of the present disclosure. In some examples, the UL-centric dynamic subframe type may be selected for the subframe 230, by a network access device, based at least in part on a UL/DL traffic ratio. For example, the network access device may select a UL-centric dynamic subframe type for the subframe 230 when the UL/DL traffic ratio indicates more traffic is queued by one or more UEs for transmission to the network access device than is queued by the network access device for transmission to the one or more UEs. Alternatively, and by way of further example, the network access device may select a UL-centric dynamic subframe type for the subframe 230 when the UL/DL ratio indicates a particular percentage of the total amount of queued traffic for one or more UEs may be UL traffic, or when a particular percentage of the UL traffic included in the UL/DL ratio may be associated with a priority above a threshold. In some examples, the network access device and UEs that communicate in the subframe 230 may be examples of aspects of the network access devices 105 and UEs 115 described with reference to FIG. 1.

The subframe 230 may begin with a header 235 including a DL control region. An indication of the UL-centric dynamic subframe type of the subframe 230 may be transmitted to one or more UEs that transmit or receive data in the subframe 230, by the network access device, in the header 235 (and/or in the DL control region). Following the header 235, the network access device may schedule a data region 240 of the subframe 230 (e.g., a UL data region). The data region 240 may be optionally separated from the header 235 by a first guard period 245 in the time domain, to give UEs time to perform RF switching.

Following the data region 240, the network access device may optionally schedule a DL control region 250 and/or allocate at least one HARQ transmission resource for the network access device to transmit HARQ feedback for the subframe 230 (e.g., one or more ACKs or NAKs) to one or more UEs. The DL control region 250 and/or at least one HARQ transmission resource may be optionally bounded by a second guard period 255 in the time domain, to give UEs time to perform RF switching. Alternatively, the DL control region 250 may not be provided, and may be merged into a DL control region of a subsequently-transmitted subframe. In some examples, the subframe 230 may have a self-contained subframe structure (e.g., a subframe structure in which all transmissions during the subframe are ACK'd or NAK'd during the subframe).

FIG. 2C shows an example of a subframe 265 associated with a bi-directional dynamic subframe type, in accordance with one or more aspects of the present disclosure. In some examples, the bi-directional dynamic subframe type may be selected for the subframe 265, by a network access device, based at least in part on a UL/DL traffic ratio. For example, the network access device may select a bi-directional dynamic subframe type for the subframe 265 when the UL/DL traffic ratio indicates traffic is queued by one or more UEs for transmission to the network access device and traffic is queued by the network access device for transmission to the one or more UEs. Alternatively, and by way of further example, the network access device may select a bi-directional dynamic subframe type for the subframe 265 when a particular percentage of both the UL traffic and the DL traffic included in the UL/DL ratio is associated with a priority above a threshold. In some examples, the network access device and UEs that communicate in the subframe 265 may be examples of aspects of the network access devices 105 and UEs 115 described with reference to FIG. 1.

A subframe 265 may begin with a header 270 including a DL control region. An indication of the bi-directional dynamic subframe type of the subframe 265 may be transmitted to one or more UEs that may transmit or receive data in the subframe 265, by the network access device, in the header 270 (and/or in the DL control region). Following the header 270, the network access device may schedule a UL control region 275, which is followed by a plurality of data regions of the subframe 265 (e.g., a first data region 280 (e.g., a DL data region), and a second data region 285 (e.g., a UL data region)). The UL control region 275 may be optionally separated from the header 270 by a first guard period 290 in the time domain, to give UEs 115 time to perform RF switching. Similarly, the second data region 285 may be optionally separated from the first data region 280 by a second guard period 295. In some examples, the second data region 285 may be part of a UL region including another UL control region and/or an allocation of at least one HARQ transmission resource for a UE 115 (or UEs 115) to transmit HARQ feedback for the subframe 265 (e.g., one or more ACKs or NAKs) to the network access device; Alternatively, the UL control information could also be deferred to the UL control region of a subsequently-transmitted, rendering the subframe structure non-self-contained.

Following the second data region 285, the network access device may optionally schedule a downlink control region 297 and/or allocate at least one HARQ transmission resource for the network access device to transmit HARQ feedback for the subframe 265 (e.g., one or more ACKs or NAKs) to one or more UEs. Alternatively, the DL control region 297 may not be included in subframe 265, and may be merged into a DL control region of a subsequently-transmitted subframe. In some examples, the subframe 265 may have a self-contained subframe structure (e.g., a subframe structure in which all transmissions during the subframe are ACK'd or NAK'd during the subframe).

Some subframes (e.g., some subframes other than those shown in FIGS. 2A, 2B, and 2C) may be associated with other dynamic subframe types, such as a full-duplex dynamic subframe type (not shown). The headers 205, 235, and 270 of the subframes 200, 230, and 265 described with reference to FIGS. 2A, 2B, and 2C may have a same or similar structure, with each header including an indication of a dynamic subframe type. In some examples, a dynamic subframe type may be identified before the data region(s) of a corresponding subframe are decoded or transmitted. In some examples, a dynamic subframe type associated with a subframe may be transmitted to a UE in a temporally first symbol period of a two (or more) symbol period DL control region. In this manner, a UE may complete identification (e.g., decoding) of the dynamic subframe type during a second or subsequent symbol period of the DL control region (i.e., before receipt of a data region of the subframe). In the case of a subframe having a UL data region following the subframe's header, a UE may complete identification (e.g., decoding) of a dynamic subframe type associated with the subframe during a guard period following the header.

In some examples, a dynamic subframe type may be indicated by broadcasting the dynamic subframe type to UEs associated with a network access device (or cell). In some examples, a dynamic subframe type may be indicated by unicasting the dynamic subframe type to a subset of UEs associated with a network access device (or cell). In some examples, the subset of UEs to which a dynamic subframe type is unicast may include a subset of UEs that are active during the subframe for which the dynamic subframe type is unicast (e.g., a subset of non-discontinuous reception (non-DRX) mode UEs). Unicast transmission of a dynamic subframe type may be useful, for example, if a wireless communication system or network access device allows a multiplexing (or simultaneous transmission) of different dynamic subframe types, or when a number of UEs only support unicast control. In some examples, a dynamic subframe type may be indicated by transmitting an indication of the dynamic subframe type within a narrow band of frequencies of a system bandwidth, as described with reference to FIG. 3.

In some examples, a dynamic subframe type may be indicated by transmitting an indicator (or set of indicators) that distinguish between a DL-centric dynamic subframe type and a UL-centric dynamic subframe type, or between a DL-centric dynamic subframe type, a UL-centric dynamic subframe type, a full-duplex dynamic subframe type, a dynamic switch dynamic subframe type, a mixed interference measurement dynamic subframe type, or a distributed scheduling dynamic subframe type. In some cases, the dynamic subframe type may be determined using a combination of the content of the indication (i.e., one or more bits) and any context or mode that has been configured. That is, a number of bits used for the indication may be content dependent. For example, a wireless communications system may be configured to support a subset of dynamic subframe types, and this subset of dynamic subframe types may not change dynamically. As a result, the indication may only need to specify which dynamic subframe type(s) within the subset of dynamic subframe types is in use for a TDD subframe. In another example, a UE may have previously used a subset of dynamic subframe types, and based on the subset of previously used dynamic subframe types, the UE may determine how to interpret the bits used for the indication of the dynamic subframe type. Accordingly, additional information associated with identifying various dynamic subframe types may be kept relatively small.

In some examples, a dynamic subframe type may be indicated by transmitting at least one of: a first bit indicating a UL data transmission direction or a DL data transmission direction and/or a second bit indicating a half-duplex data transmission or a full-duplex data transmission. In some examples, UEs that are not capable of communicating according to a full-duplex subframe structure may ignore the second bit and communicate in accordance with the first bit, or may ignore the subframe when the second bit indicates a full-duplex dynamic subframe type.

Figure 3:
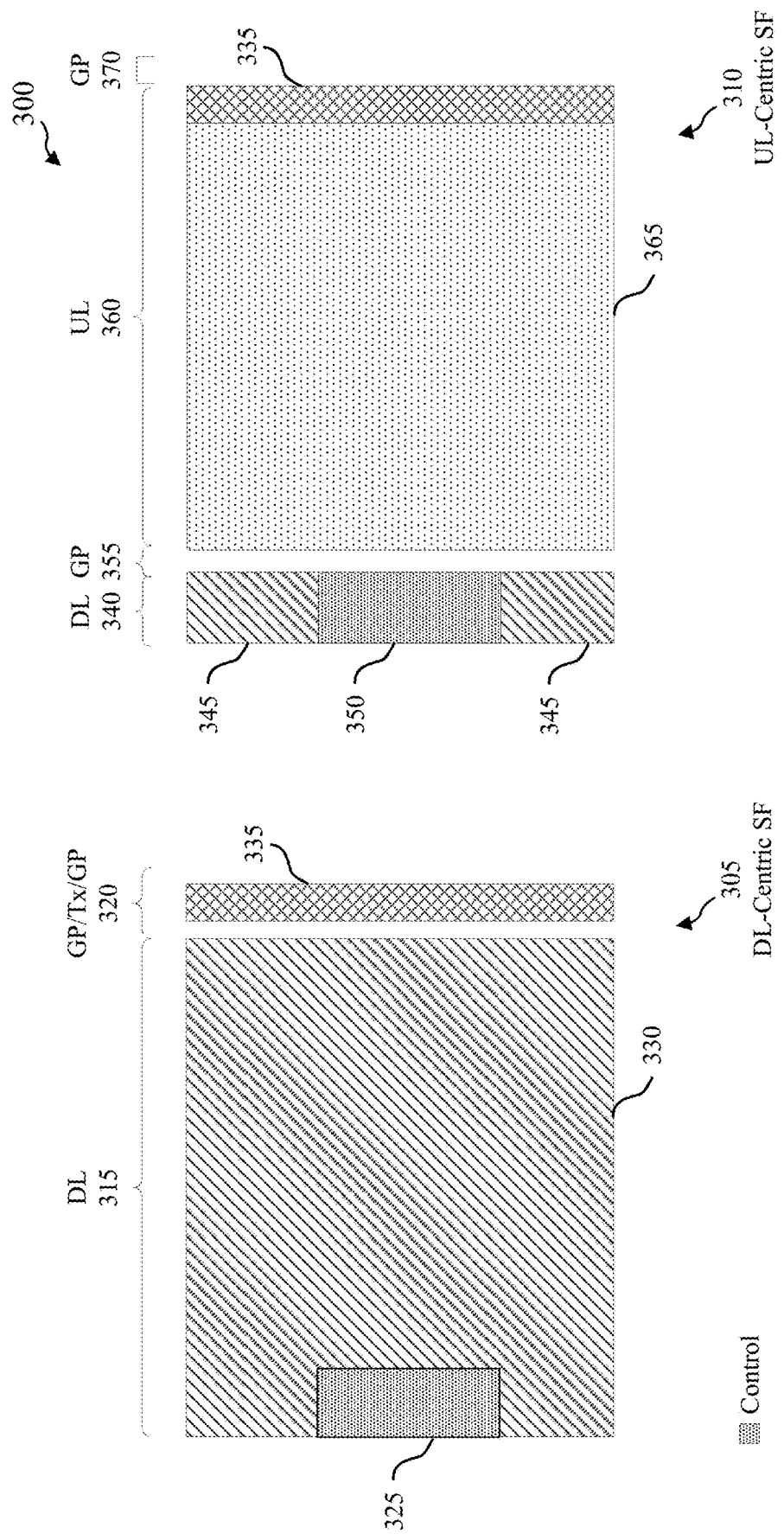
FIG. 3 illustrates an example of a first subframe associated with a DL-centric dynamic subframe type, and a second subframe associated with a UL-centric dynamic subframe type, in accordance with one or more aspects of the present disclosure.

FIG. 3 illustrates an example 300 of a first subframe 305 associated with a DL-centric dynamic subframe type, and a second subframe 310 associated with a UL-centric dynamic subframe type, in accordance with one or more aspects of the present disclosure. In some examples, the network access device and UEs that communicate in the first subframe 305 or the second subframe 310 may be examples of aspects of the network access devices 105 and UEs 115 described with reference to FIG. 1.

As mentioned above, some subframes may have a self-contained subframe structure. In the example of FIG. 3, the subframe 305 includes a DL portion 315 and a UL portion 320. The UL portion 320 may be bounded on either side, in the time domain, by guard periods. A DL control region 325 may be transmitted at a beginning of the DL portion 315, within a subset of frequency resources of the DL portion 315, and over one or two symbol periods of the DL portion 315. The DL control region 325 may include an indication of a dynamic subframe type (e.g., a DL-centric dynamic subframe type) for the subframe 305. In some examples, the DL control region 325 may include a subset of frequency resources that have a narrower bandwidth than the total bandwidth used for communication between the network access device and a UE.

The relatively narrow bandwidth of the DL control region 325 may allow for reduced reference signal (e.g., cell-specific reference signal (CRS)) overhead relative to a wider bandwidth, and may allow for lower-tier UEs (e.g., machine-type communication (MTC) UEs) to access a network through a network access device with reduced hardware complexity and reduced power consumption. In some examples, the resources of the DL control region 325 may be multiplexed in frequency, within the symbols used to transmit the DL control region 325, with resources allocated to a DL data region 330. Frequency multiplexing of the DL control region 325 may enable utilization of more or all of the channel bandwidth during the symbol periods used to transmit the DL control region 325, despite the DL control region 325 only occupying a narrow band of the total bandwidth used for communication between the network access device and a UE. The subframe 305 may end, in some examples, with a UL transmission 335, which may be referred to as a "UL common burst" when its structure is shared by subframes associated with a TDD DL-centric subframe type and subframes associated with a TDD UL-centric subframe type. Scheduling of the UL transmission 335 may be independent of the DL data region 330, or may be pre-scheduled, in some examples.

In the subframe 310, a DL portion 340 is located at the beginning of the subframe 310, followed by a guard period 355 during which RF circuitry may be switched from receive mode to transmit mode, followed by a UL portion 360. A second guard period 370 may follow the UL portion 360 to provide for switching of transmit/receive circuitry from the transmit mode back to the receive mode in preparation for reception of a DL control region of a subsequent subframe. Within the DL portion 340, a DL control region 350 may occupy a portion of the entire transmission bandwidth, similarly to the DL control region 325 of the subframe 305.

The DL control region 350 may include an indication of a dynamic subframe type (e.g., a UL-centric dynamic subframe type) for the subframe 310. The DL control region 350 may be multiplexed with other DL data resources 345 in order to utilize the entire transmission bandwidth. The UL portion 360 may include a UL data region 365. The UL portion 360 may also include a UL common burst 335, which may be formatted similarly to the UL common burst described with reference to the subframe 305. Thus, both the DL-centric subframe 305 and the UL-centric subframe 310 may have self-contained TDD subframe structures.

A dynamic subframe type may be indicated in various ways. For example, an indication of a dynamic subframe type may be embedded in a reference signal, such as CRS. When embedded in a reference signal, in some examples, hypothesis testing may be used to determine the value of one bit of information indicating a DL-centric dynamic subframe type or a UL-centric dynamic subframe type. As another example, an indication of a dynamic subframe type may be transmitted in a subframe type indicator channel, as described, for example, with reference to FIG. 7. As yet another example, a dynamic subframe type may be indicated by transmitting a type of DCI corresponding to the dynamic subframe type. For example, a DL assignment may be transmitted in a subframe associated with a DL-centric dynamic subframe type, and a UL grant may be transmitted in a subframe associated with a UL-centric dynamic subframe type. In some examples, other types of DCI may be transmitted for a subframe associated with a bi-directional dynamic subframe type or a full-duplex dynamic subframe type.

Figure 4A:
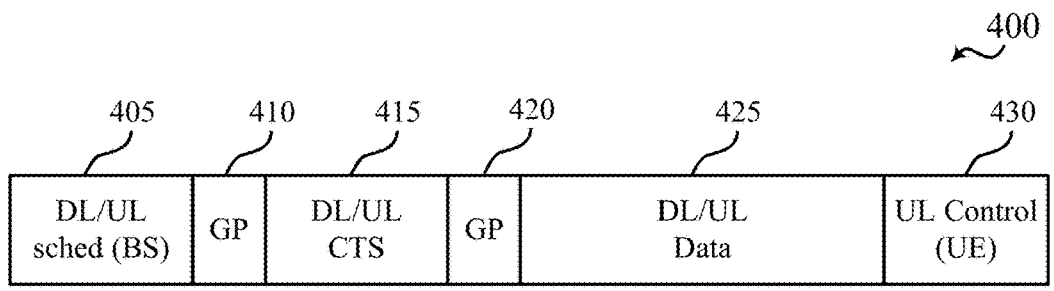
FIGS. 4A, 4B, and 4C show examples of subframes associated with a dynamic switch dynamic subframe type, in accordance with one or more aspects of the present disclosure.
Figure 4B:
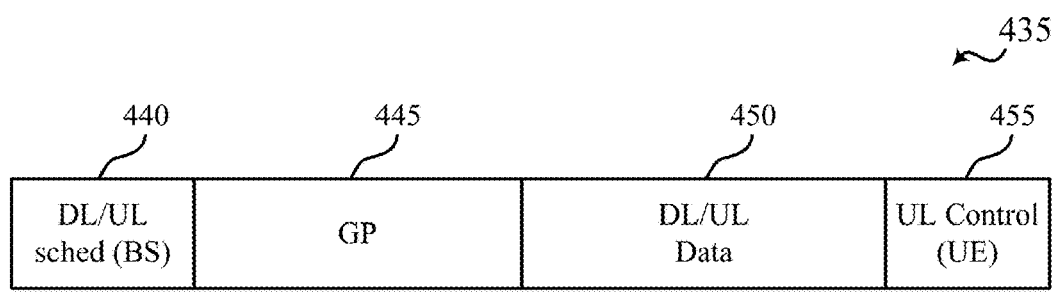
Figure 4C:
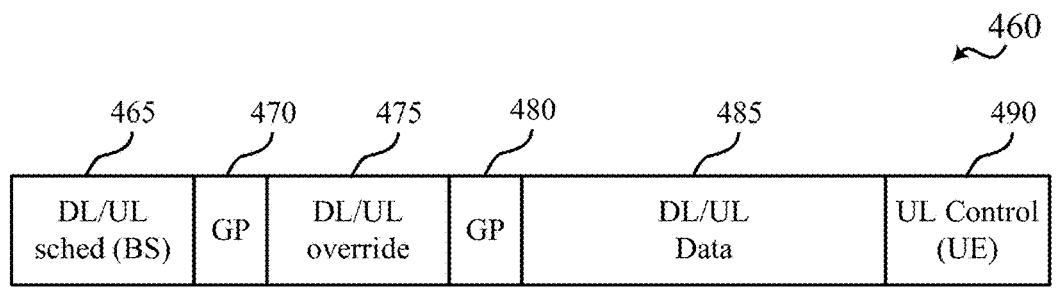

FIGS. 4A, 4B, and 4C show examples of dynamic subframe types used for dynamic frame switching. In some cases, a wireless communications system may support dynamic scheduling of mixed UL and DL transmissions, and may use UL or DL-centric dynamic subframes that include additional features used in dynamic frame switching environments, such as channel clearing features (e.g., clear-to-send (CTS) messages) and override messages. The dynamic subframe types illustrated in FIGS. 4A, 4B, and 4C may be examples of dynamic subframe types selected for a TDD subframe. FIG. 4A shows an example of subframe 400 associated with a dynamic switch dynamic subframe type, in accordance with one or more aspects of the present disclosure. In some cases, a dynamic switch dynamic subframe type may be selected for subframe 400, by a network access device, such as a base station, based at least in part on a traffic condition, such as a UL/DL traffic ratio. In some examples, the network access device and UEs that communicate in subframe 400 may be examples of aspects of the network access devices 105 and UEs 115 described with reference to FIG. 1.

Subframe 400 may begin with a DL/UL scheduling information region 405, where an indication of the dynamic switch dynamic subframe type of subframe 400 may be transmitted, by the network access device to one or more UEs that may transmit or receive data in subframe 400, in DL/UL scheduling information region 405, in a control region, or in some other region. In some cases, DL/UL scheduling information may be transmitted in a control channel (e.g., a physical downlink control channel (PDCCH)), and may be transmitted to a UE in a temporally first symbol period of a two (or more) symbol period control region.

Following the DL/UL scheduling information region 405, the network access device may schedule a DL/UL CTS region 415. The DL/UL CTS region may include a CTS message used to clear a channel, such as a channel in unlicensed RF spectrum, from communication by neighboring devices (e.g., neighboring UEs and network access devices). As a result, the CTS message may silence surrounding devices and any interference that may be caused by those devices. The DL/UL CTS region 415 may be bounded by a first guard period 410 and a second guard period 420. A DL/UL data region 425 of subframe 400 may then be scheduled by the network access device, and a UL control region 430 may follow the DL/UL data region 425 of subframe 400. In some examples, subframe 400 may have a self-contained dynamic switch dynamic subframe structure (e.g., a subframe structure in which all transmissions during the subframe are ACK'd or NACK'd during the subframe).

FIG. 4B shows an example of subframe 435 associated with a dynamic switch dynamic subframe type, in accordance with one or more aspects of the present disclosure. A dynamic switch dynamic subframe type may be selected for subframe 435, by a network access device, based at least in part on a traffic condition. In some examples, the network access device and UEs that communicate in subframe 435 may be examples of aspects of the network access devices 105 and UEs 115 described with reference to FIG. 1. Subframe 435 may begin with a DL/UL scheduling information region 440. As described above, an indication of the dynamic switch dynamic subframe type of subframe 435 may be transmitted using DL/UL scheduling information region 440, a control region, or in some other region. In some examples, the indication of the dynamic switch dynamic subframe type may be included in a temporally first symbol period of a two (or more) symbol period control region of subframe 435. In this manner, a UE may complete identification (e.g., decoding) of the dynamic switch dynamic subframe type during a second or subsequent symbol period of the DL control region (i.e., before receipt of a data region of the subframe).

Following the DL/UL scheduling information region 440, the network access device may schedule a DL/UL data region 450, where DL/UL data region 450 may be separated from DL/UL scheduling information region 440 by a guard period 445. UL control region 455 used for the transmission of UL control information by a UE may be included in subframe 435 following the DL/UL data region 450.

FIG. 4C shows an example of a subframe 460 associated with a dynamic switch dynamic subframe type, in accordance with one or more aspects of the present disclosure. A dynamic switch dynamic subframe type may be selected for subframe 460, by a network access device, based at least in part on a traffic condition. In some examples, the network access device and UEs that communicate in subframe 460 may be examples of aspects of the network access devices 105 and UEs 115 described with reference to FIG. 1. Subframe 460 may begin with a DL/UL scheduling information region 465, which may include an indication of the dynamic subframe type in a temporally first symbol period.

Subframe 460 may include, following a DL/UL scheduling information region 465, a DL/UL override region 475. The DL/UL override region 475 may include an override message that provides an indication of resources associated with DL or UL communications. In some examples, DL/UL override region 475 may be optionally bounded by a first guard period 470 and a second guard period 480. The network access device may further schedule a DL/UL data region 485 followed by a UL control region 490 in subframe 460.

A dynamic switch dynamic subframe type may be indicated in various ways. For example, an indication of a dynamic switch dynamic subframe type may be embedded in a reference signal. As another example, an indication of a dynamic switch dynamic subframe type may be transmitted in a subframe type indicator channel, as described, for example, with reference to FIG. 7. In another example, a dynamic switch dynamic subframe type may be indicated by transmitting a type of DCI corresponding to the dynamic switch dynamic subframe type.

Figure 5A:
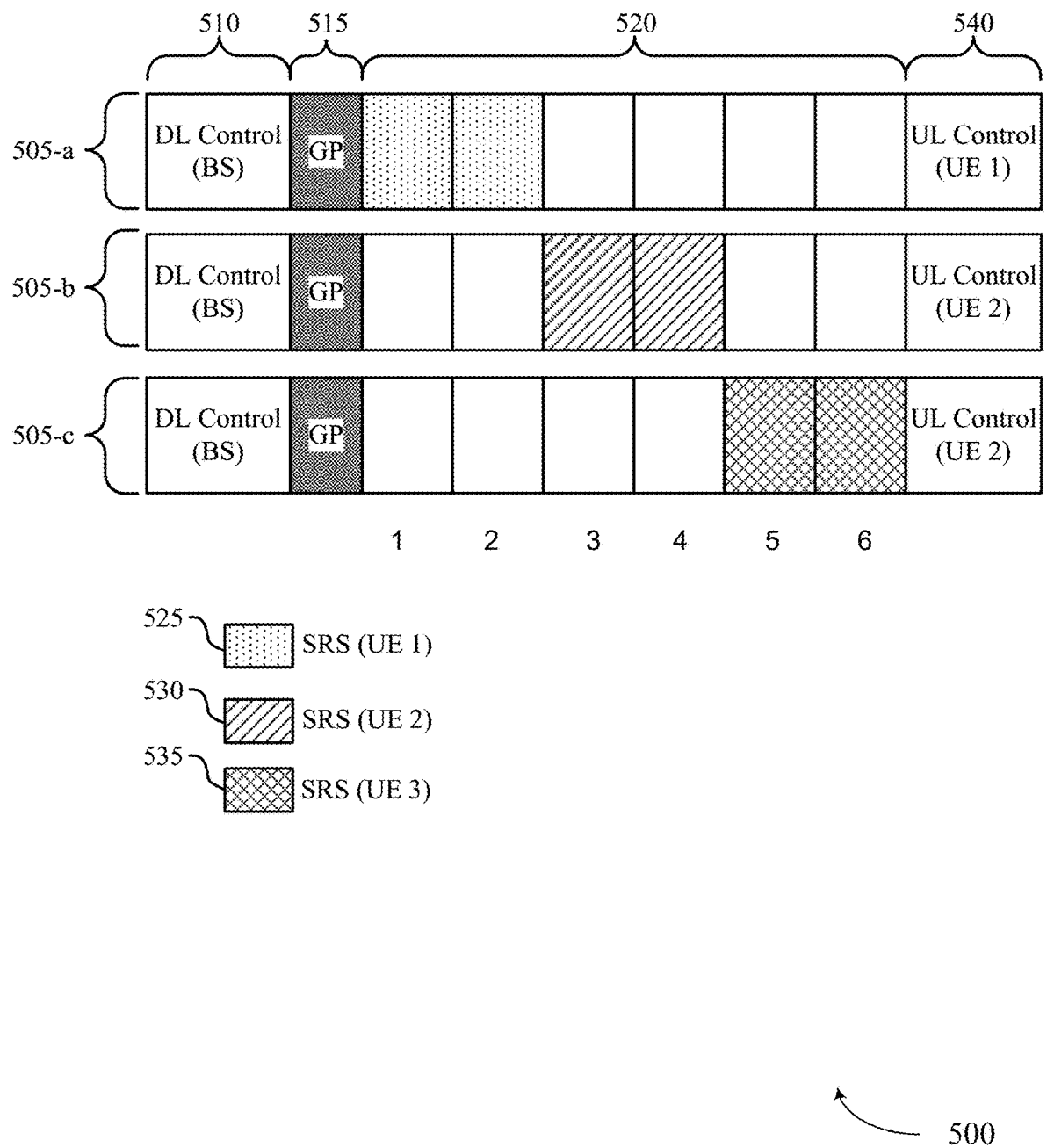
FIGS. 5A and 5B show examples of subframes associated with a mixed interference measurement dynamic subframe type, in accordance with one or more aspects of the present disclosure.
Figure 5B:
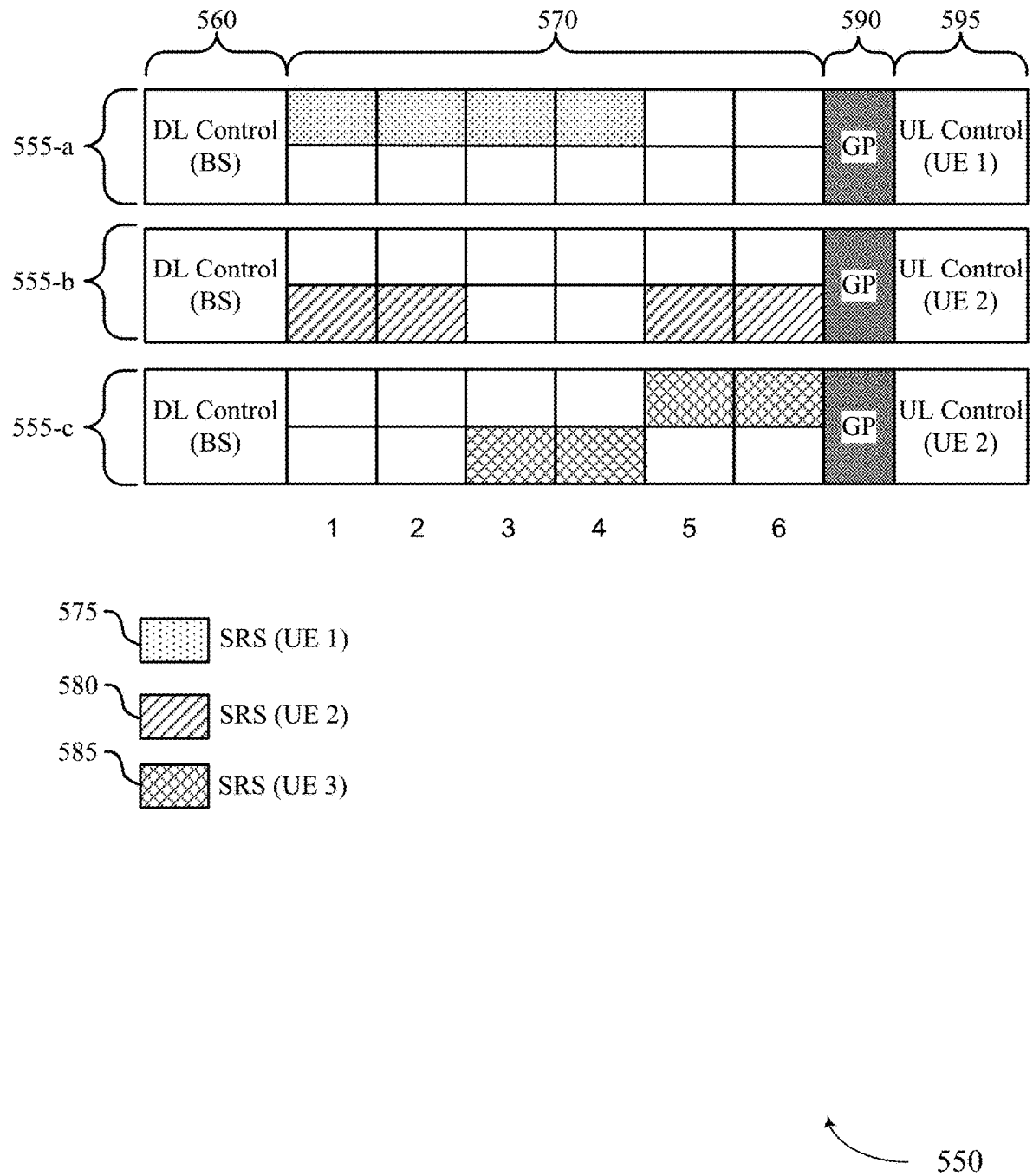

FIGS. 5A and 5B show various examples of dynamic subframe types that may be used for updating jamming graphs based on mixed interference measurements. In some cases, a wireless communications system may support mixed UL and DL transmissions, which may be network scheduled by a network access device based at least in part on jamming graphs (e.g., semi-statically updated jamming graphs that summarize UL/DL and DL/UL mixed interference). Accordingly, the network access device may schedule mixed interference measurement dynamic subframe types. The dynamic subframe types illustrated in FIGS. 5A and 5B may be examples of dynamic subframe types selected for a TDD subframe. FIG. 5A shows an example of subframes 500 associated with a mixed interference measurement dynamic subframe type, in accordance with one or more aspects of the present disclosure. In some cases, a mixed interference dynamic subframe type may be selected for subframes 500, by a network access device such as a base station, based at least in part on a traffic condition (e.g., a UL/DL traffic ratio). Subframes 500 may illustrate an example of UL-centric dynamic subframe types scheduled for respective UEs (e.g., subframes 505-a, 505-b and 505-c for a first, second, and third UE respectively). In some examples, the network access device and UEs that communicate using subframes 500 may be examples of aspects of the network access devices 105 and UEs 115 described with reference to FIG. 1.

Each of the subframes 500 may begin with a DL control region 510, which may include an indication, to multiple UEs that may transmit or receive data in subframes 505-a, 505-b, and 505-c, of the mixed interference measurement dynamic subframe type of subframes 500. In some examples, the mixed interference measurement dynamic subframe type may be identified before the other regions of a corresponding subframe are decoded or transmitted. For example, a mixed interference measurement dynamic subframe type associated with subframes 500 may be transmitted to a UE in a temporally first symbol period of a two (or more) symbol period DL control region. In this manner, a UE may complete identification (e.g., decoding) of the mixed interference measurement dynamic subframe type during a second or subsequent symbol period of the DL control region (i.e., before receipt of a data region of the subframe).

Following the DL control region 510, the network access device may schedule a measurement region 520 in each of the subframes 500, where the measurement region 520, in some examples, is separated from DL control region 510 by a guard period 515. Measurement region 520 may be used by a UE to transmit during a subset of SRS regions, and perform signal measurements (e.g., from the other UEs using subframes 500) during the SRS regions in which the UE is not transmitting. For example, a first UE may transmit SRS in a first subset of SRS regions of first subframe 505-a (e.g., SRS regions 525 transmitted in SRS regions 1 and 2), and may listen for the remaining duration of the measurement region 520 (e.g., SRS regions 3 through 6). Using second subframe 505-b, a second UE may perform measurements of the SRS transmitted by the first UE (during SRS regions 525) and transmit SRS in a second subset of SRS regions (e.g., SRS regions 530 transmitted in SRS regions 3 and 4) and subsequently perform measurements for the remainder of measurement region 520. Additional UEs scheduled to use the mixed interference measurement dynamic subframe type may perform similar operations during a different subset of SRS regions (e.g., a third UE may perform measurements in subframe 505-c while the first and second UEs transmit SRS, and subsequently transmit SRS during SRS region 535). The network access device may then schedule a UL control region 540 in each of the subframes 500. In some examples, subframes 500 may have a self-contained mixed interference measurement dynamic subframe structure (e.g., a subframe structure in which all transmissions during the subframe are ACK'd or NACK'd during the subframe).

FIG. 5B shows an example of subframes 550 associated with a mixed interference measurement dynamic subframe type, in accordance with one or more aspects of the present disclosure. In some cases, a mixed interference dynamic subframe type may be selected for subframes 550, by a network access device such as a base station, based at least in part on a UL/DL traffic ratio. Subframes 550 may illustrate an example of UL-centric dynamic subframe types scheduled for respective UEs (e.g., subframes 555-a, 555-b and 555-c for a first, second, and third UE respectively), where the UEs may be scheduled to transmit simultaneously (e.g., using different frequency resources). In some examples, the network access device and UEs that communicate using subframes 550 may be examples of aspects of the network access devices 105 and UEs 115 described with reference to FIG. 1.

Each of the subframes 550 may begin with a DL control region 560, which may include an indication, to multiple UEs that may transmit or receive data in subframes 555-a, 555-b, and 555-c, of the mixed interference measurement dynamic subframe type of subframe 550. For example, a mixed interference measurement dynamic subframe type associated with subframes 550 may be transmitted to UEs in a temporally first symbol period of a two (or more) symbol period DL control region. Following the DL control region 560, the network access device may schedule a measurement region 570 in each of the subframes 550. Measurement region 570 may be used by a UE to transmit during a subset of SRS regions, which may correspond to subband partitioning of the subframe, and perform signal measurements (e.g., from the other UEs using subframes 550) during the SRS regions in which the UE is not transmitting.

In some cases, different UEs may be grouped to transmit (using different frequency resources) and perform measurements together based at least in part on the mixed interference measurement dynamic subframe type. For example, a first UE may transmit SRS in a subset of SRS regions of subframe 555-a (e.g., SRS regions 575 transmitted in SRS regions 1 and 2) using a first set of frequency resources. A second UE may simultaneously transmit in a subset of SRS regions of subframe 555-b (e.g., SRS regions 580 in SRS regions 1 and 2) using a different set of frequency resources. The first and second UE may perform measurements during other times of measurement region 570, or may transmit additional SRS (e.g., in coordination with other UEs) using different sets of frequency resources. The network access device may then schedule a UL control region 595 in each of the subframes 500 following a guard period 590. In some examples, subframes 550 may have a self-contained mixed interference measurement dynamic subframe structure (e.g., a subframe structure in which all transmissions during the subframe are ACK'd or NACK'd during the subframe).

A mixed interference measurement dynamic subframe type may be indicated in various ways. For example, an indication of mixed interference measurement dynamic subframe type may be embedded in a reference signal. As another example, an indication of a mixed interference measurement dynamic subframe type may be transmitted in a subframe type indicator channel, as described, for example, with reference to FIG. 7. As yet another example, a mixed interference measurement dynamic subframe type may be indicated by transmitting a type of DCI corresponding to the distributed scheduling dynamic subframe type.

Figure 6:
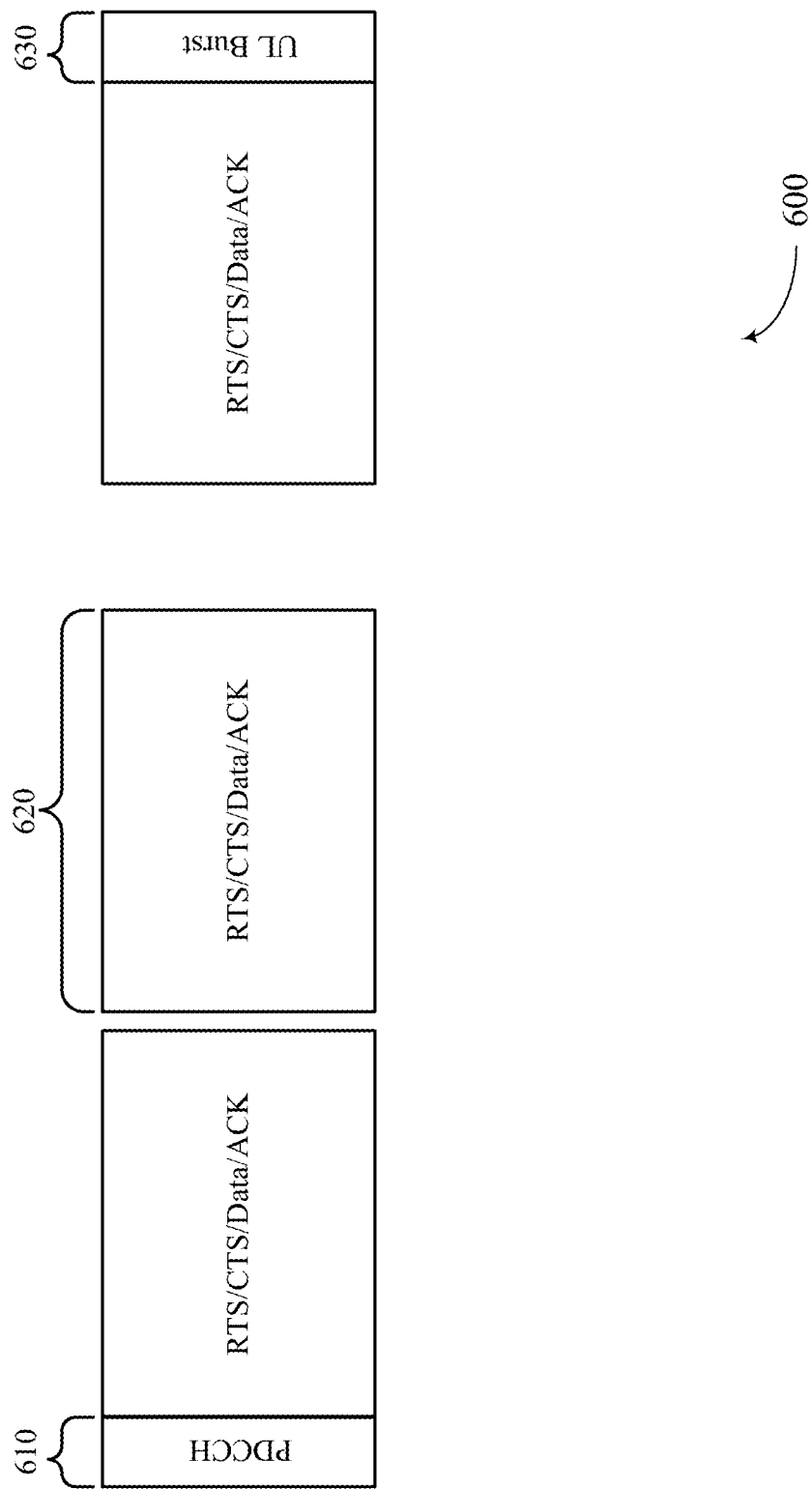
FIG. 6 shows an example of a subframe associated with a distributed scheduling dynamic subframe type, in accordance with one or more aspects of the present disclosure.

FIG. 6 shows an example of a subframe 600 associated with a distributed scheduling dynamic subframe type, in accordance with one or more aspects of the present disclosure. In some examples, a wireless communication system may include distributed scheduling techniques for a subset of UEs (i.e., scheduling may not be centralized at a network access device, even when the network access device is a part of the network). As a result, the scheduling of dynamic subframes for contention-based access (e.g., based on request-to-send (RTS)-CTS signaling, node discovery, etc.) may be dynamically signaled by a network access device. In some cases, a distributed scheduling dynamic subframe type may be selected for subframe 600, by a network access device such as a base station, based at least in part on a traffic condition, such as a UL/DL traffic ratio. Subframe 600 may illustrate an example of a dynamic subframe type scheduled for UEs, which may be examples of MTC-type UEs. In some examples, the network access device and UEs that communicate using subframe 600 may be examples of aspects of the network access devices 105 and UEs 115 described with reference to FIG. 1.

Subframe 600 may begin with a control region (e.g., PDCCH 610) transmitted by the wireless access device. In some cases, PDCCH 610 may include an indication, to UEs that may transmit or receive data in subframe 600, of the distributed scheduling dynamic subframe type of subframe 600. For example, a mixed interference measurement dynamic subframe type associated with subframes 550 may be transmitted to UEs in a temporally first symbol period of a two (or more) symbol period DL control region. In some cases, PDCCH 610 may include assignment information for a relay UE, assignment information for an end device UE, and/or data slot partition information of a serving network access device.

Following PDCCH 610, the network access device may schedule one or more partitioned regions within subframe 600, such as RTS/CTS/Data/ACK regions 620, for use by one or more UEs. In some examples, RTS/CTS/Data/ACK regions 620 may enable the use of RTS and CTS channel clearing techniques to enable the transmission of data or ACK/NACK within the same RTS/CTS/Data/ACK region 620. In some cases, the RTS/CTS/Data/ACK regions may include a gap during which there are no transmissions. The RTS/CTS/Data/ACK regions 620 may be followed by a common UL burst 630. The UL burst 630 may, for example, be used to transmit an indication of subsequent traffic and/or request additional resources. In some examples, subframe 600 may have a self-contained distributed scheduling dynamic subframe structure (e.g., a subframe structure in which all transmissions during the subframe are ACK'd or NACK'd during the subframe).

A distributed scheduling dynamic subframe type may be indicated in various ways. For example, an indication of a distributed scheduling dynamic subframe type may be embedded in a reference signal. As another example, an indication of a distributed scheduling dynamic subframe type may be transmitted in a subframe type indicator channel, as described, for example, with reference to FIG. 7. As yet another example, a distributed scheduling dynamic subframe type may be indicated by transmitting a type of DCI corresponding to the distributed scheduling dynamic subframe type.

Figure 7:
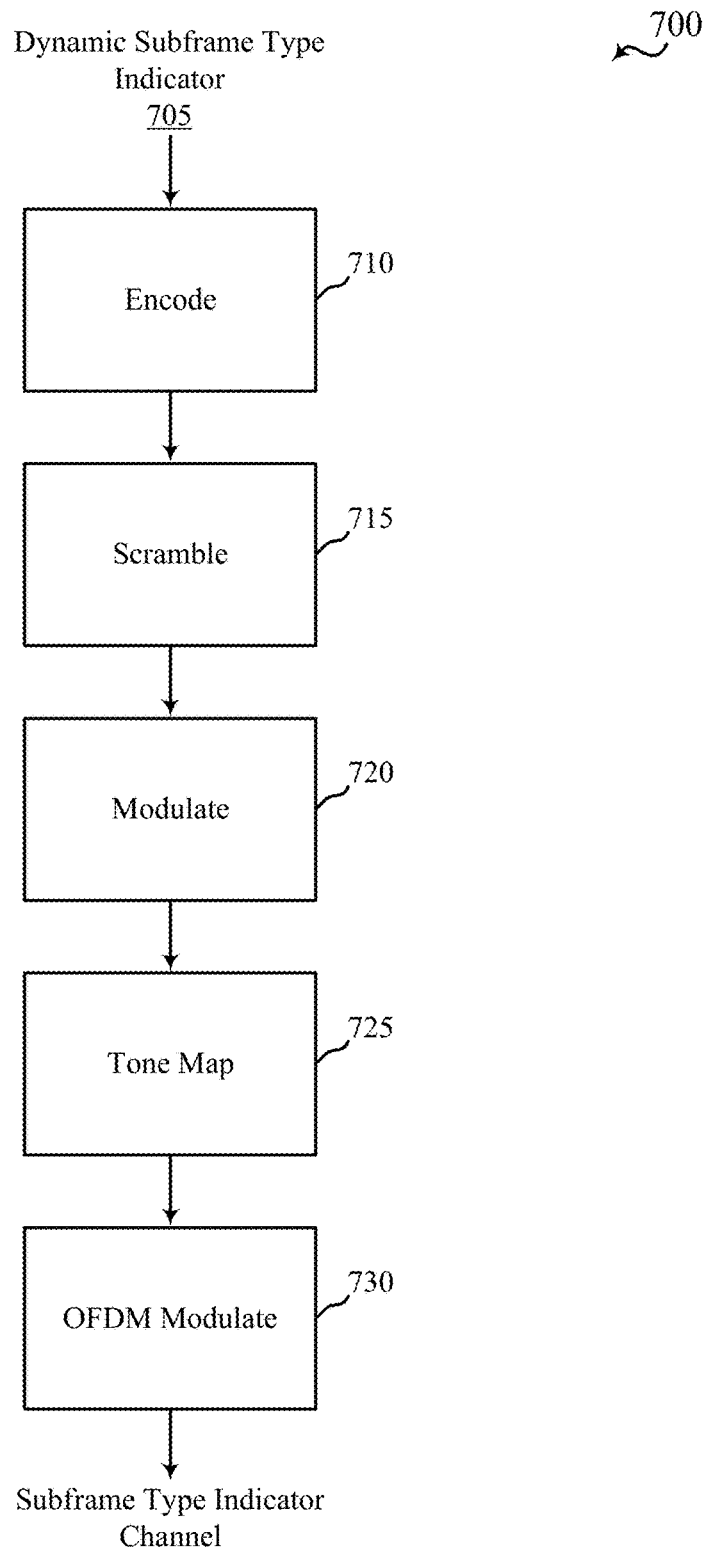
FIG. 7 is a flow chart illustrating an example of a method for indicating a dynamic subframe type in a subframe type indicator channel, in accordance with one or more aspects of the present disclosure.

FIG. 7 is a flow chart illustrating an example of a method 700 for indicating a dynamic subframe type in a subframe type indicator channel, in accordance with one or more aspects of the present disclosure. In some examples, the method 700 may be performed by a network access device, such as one of the network access devices 105 described with reference to FIG. 1.

The method 700 begins with the receipt of a dynamic subframe type indicator 705. The dynamic subframe type indicator 705 may in some examples include one or two bits of information (e.g., a first bit indicating a UL data transmission direction or a DL data transmission direction and/or a second bit indicating a half-duplex data transmission or a full-duplex data transmission). In other examples, the dynamic subframe type indicator 705 may carry more bits to specify a subset of the attributes of the subframe as described above (e.g., subframe numerology). The method 700 may encode and scramble the dynamic subframe type indicator 705 at blocks 710 and 715. For example, the dynamic subframe type indicator 705 may be block encoded at block 710 and binary scrambled at block 715. In some examples, the binary scrambling may be cell-specific, and in some examples may be based on a gold sequence initialized with a subframe number and a cell identifier (ID). In some examples, the encoding and processing at blocks 710 and 715 may be similar to the encoding and processing of a physical channel format indicator channel (PCFICH) in an LTE/LTE-A network.

At block 720, the dynamic subframe type indicator 705 may be modulated (e.g., quadrature phase shift keying (QPSK) modulated). At block 725, the dynamic subframe type indicator 705 may be mapped to tones. At block 730, the dynamic subframe type indicator 705 may be orthogonal frequency-division multiplexing (OFDM) modulated on a subframe type indicator channel. As previously described, the dynamic subframe type indicator 705 may, in some examples, be transmitted over a narrow band and/or one symbol period (e.g., one OFDM symbol period).

Figure 8A:
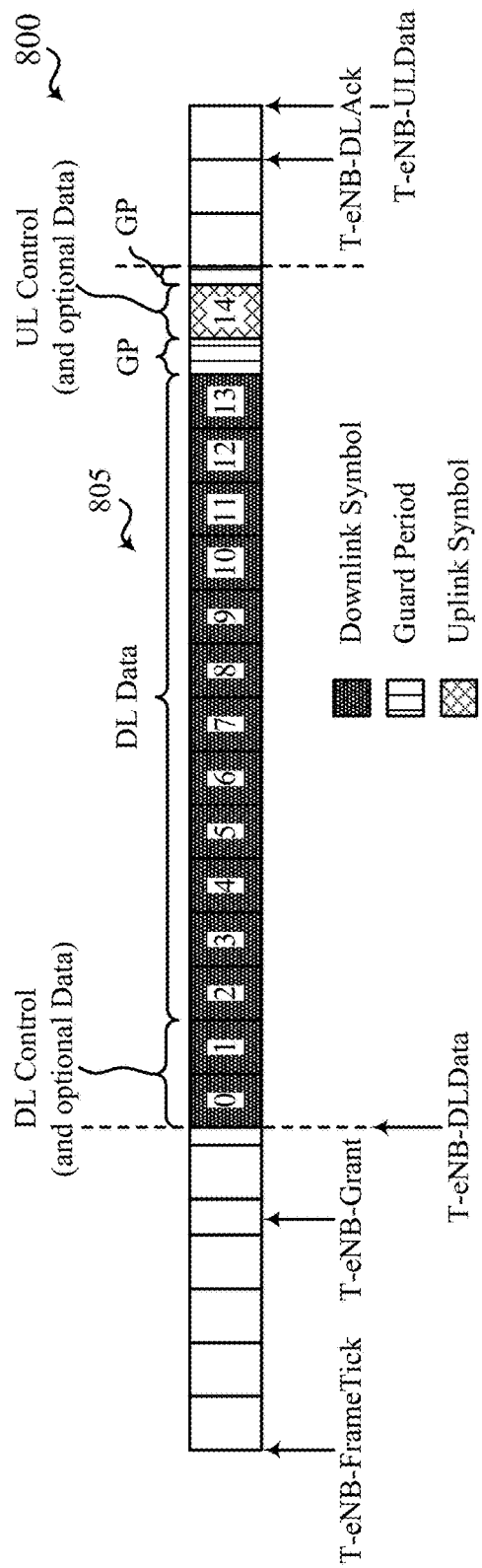
FIG. 8A shows an example timeline of operations performed by a network access device for a subframe associated with a DL-centric dynamic subframe type, in accordance with one or more aspects of the present disclosure.

FIG. 8A shows an example timeline 800 of operations performed by a network access device for a subframe 805 associated with a DL-centric dynamic subframe type, in accordance with one or more aspects of the present disclosure. In some examples, the network access device may be an example of one of the network access devices 105 (e.g., an eNB, an ANC, a RH, or a base station) described with reference to FIG. 1.

At a time T-eNB-FrameTick, a modem of the network access device may send a frame tick indication to a MAC layer, which may trigger processing at the MAC layer. Because the dynamic subframe type for the next subframe (e.g., subframe 805) is a DL-centric dynamic subframe type, the MAC layer may start computation of DL assignments (and some UL grants) for a set of one or more UEs connected to the network access device.

At a time T-eNB-Grant, the MAC layer may send the DL grants (and UL grants) to the modem for all scheduled UEs. In some examples, the MAC layer may send retransmission (ReTx) indicators (e.g., indicators of whether data to be transmitted to a UE is new data, an ReTx, or an automatic ReTx (AutoReTx)) along with the DL grants. At a time T-eNB-DLData, the MAC layer may start direct memory access (DMA) transfers of DL data (e.g., a transfer of all transport blocks (TBs) for all scheduled UEs) to the modem. At a time T-eNB-DLAck, the modem may send a DL ACK or NACK. In some cases, a UL control region may optionally include UL data, and at a time T-eNB-ULData, the modem may send UL data (TBs for all scheduled UEs) received during the UL control region (e.g., during symbol 14) of subframe 805 to the MAC layer.

Figure 8B:
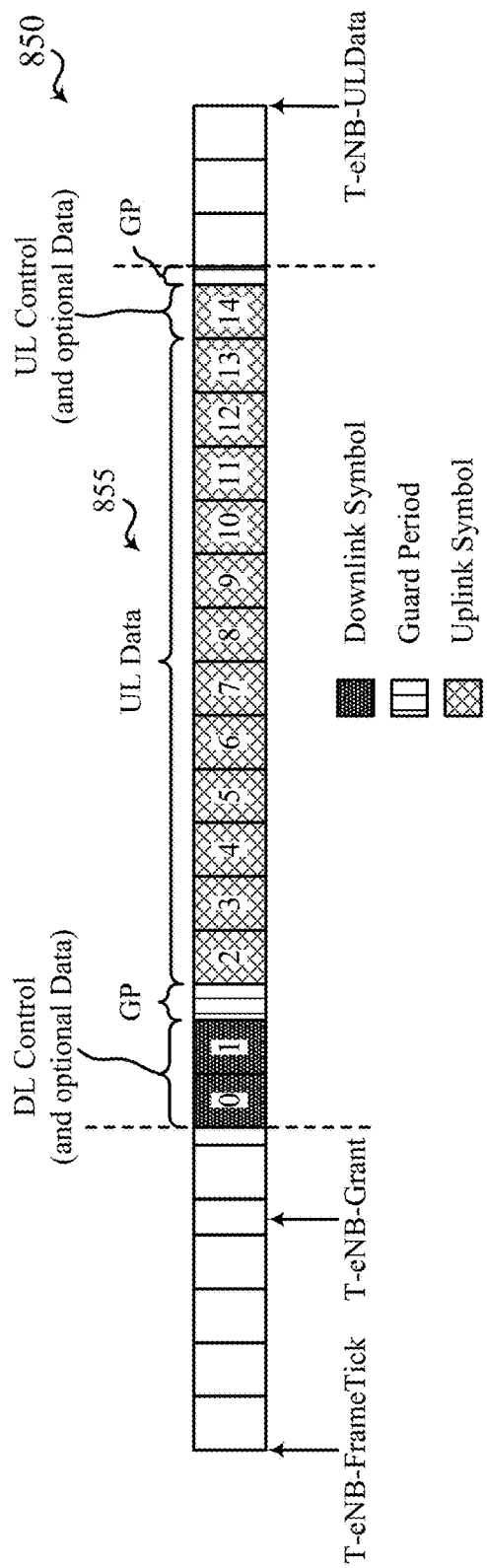
FIG. 8B shows an example timeline of operations performed by a network access device for a subframe associated with a UL-centric dynamic subframe type, in accordance with one or more aspects of the present disclosure.

FIG. 8B shows an example timeline 850 of operations performed by a network access device for a subframe 855 associated with a UL-centric dynamic subframe type, in accordance with one or more aspects of the present disclosure. In some examples, the network access device may be an example of one of the network access devices 105 (e.g., an eNB, an ANC, a RH, or a base station) described with reference to FIG. 1.

At a time T-eNB-FrameTick, a modem of the network access device may send a frame tick indication to a MAC layer. This may trigger processing at the MAC layer. Because the dynamic subframe type for the next subframe (e.g., subframe 855) is a UL-centric dynamic subframe type, the MAC layer may start computation of UL grants for a set of one or more UEs connected to the network access device. At a time T-eNB-Grant, the MAC layer may send the UL grants to the modem for all scheduled UEs. In some examples, the MAC layer may send ReTx indicators along with the UL grants. In some examples, a DL control region may optionally include DL data for one or more scheduled UEs. At a time T-eNB-ULData, the modem may send UL data (TBs for all scheduled UEs) received during the subframe 855 to the MAC layer.

Given the similarity between the MAC layer processing across subframes associated with DL-centric dynamic subframe types and UL-centric dynamic subframe types, the MAC layer processor at a network access device (e.g., an eNB) can handle dynamic UL and DL subframe operations. Furthermore, a MAC layer processor at a network access device may be configured to handle simultaneous UL and DL transmissions for a full-duplex dynamic subframe type (not shown).

FIG. 9A shows an example timeline 900 of operations performed by a UE for a subframe 905 associated with a DL-centric dynamic subframe type, in accordance with one or more aspects of the present disclosure. In some examples, the UE may be an example of one of the UEs 115 described with reference to FIG. 1.

At a time T-UE-FrameTick, a modem of the UE may send a frame tick indication to a MAC layer, which may trigger processing at the MAC layer. The MAC layer may initially assume that the dynamic subframe type for the next subframe (e.g., subframe 905) is a UL-centric dynamic subframe type. If it is later determined that the dynamic subframe type of the subframe 905 is a DL-centric dynamic subframe type, the MAC layer may perform no further action for the subframe 905. The processing at the MAC layer may include estimation of a minimum expected UL grant (e.g., a grant prediction). At a time T-UE-ULData1, the MAC layer may send UL data (e.g., UL Data 1) to the modem. The UL Data 1 may include an estimated minimum TB size (e.g., the grant prediction) for the subframe 905.

At a time T-UE-Grant, the modem may send DL assignment or UL grant information received in one or more symbols of a DL control region of the subframe 905 to the MAC layer. Upon the MAC layer identifying a DL assignment for a DL-centric subframe type, then the MAC layer may assume that the TB sent in UL Data 1 command has been discarded by the modem. If the MAC layer identifies a UL grant for a DL-centric dynamic subframe type, the MAC layer may begin creating a TB. At a time T-UE-ULData, the MAC layer may send UL data including a TB for transmission during a UL control part of the subframe 805. At the time T-UE-DLData, the modem may send a DL data indication indicating a TB has been received.

FIG. 9B shows an example timeline 950 of operations performed by a UE for a subframe 955 associated with a UL-centric dynamic subframe type, in accordance with one or more aspects of the present disclosure. In some examples, the UE may be an example of one of the UEs 115 described with reference to FIG. 1.

When a dynamic subframe type indicator is received by a UE during a first symbol period of a two symbol period DL control region, the two symbol period DL control region may allow time for processing (e.g., PHY layer and/or modem processing) of the received subframe type indicator. At a time T-UE-FrameTick, a modem of the UE may send a frame tick indication to a MAC layer. This may trigger processing at the MAC layer. The MAC layer may initially assume that the dynamic subframe type for the next subframe (e.g., subframe 955) is a UL-centric dynamic subframe type. If it is later determined that the dynamic subframe type of the subframe 955 is a DL-centric dynamic subframe type, the MAC layer may perform no further action for the subframe 955. The processing at the MAC layer may include estimation of a minimum expected UL grant (e.g., a grant prediction).

At a time T-UE-ULData1, the MAC layer may send UL data (e.g., UL Data 1) to the modem. The UL Data 1 may include an estimated minimum TB size (e.g., the grant prediction) for the subframe 955. At a time T-UE-Grant, the modem may send DL assignment or UL grant information received in one or more symbols of a DL control region of the subframe 905 to the MAC layer. Upon the MAC layer identifying a UL grant for a UL-centric dynamic subframe type, then the MAC layer may build the remaining part of a TB for the subframe. At a time T-UE-ULData2, the MAC layer may send additional UL data (e.g., UL Data 2) to the modem, to complete a TB for the subframe 955.

As discussed above, a two-symbol control region can provide the UE time for PHY layer/modem processing. For example, the UE may perform (or complete) reference signal processing and channel estimation, and dynamic subframe type indicator demodulation and decoding, during the second symbol period of the DL control region. For a DL-centric subframe, DCI for DL data (e.g., a DL assignment) may be processed and decoded during receipt of the DL control region. For a DL-centric subframe having a structure in which a demodulation reference signal (DMRS) is transmitted in the first and/or second symbol period (e.g., in which the DMRS is FDM'd within the DL control region), and in some examples, the UE may start to process the DMRS from buffered samples as soon as the DL assignment is decoded. In a DL-centric subframe, there may be no need to switch RF direction. For a UL-centric subframe, DCI for UL data (e.g., a UL grant) may be processed and decoded during receipt of the DL control region. In some examples, the UE may start to prepare a UL data transmission for at least a first symbol period as soon as the UL grant is decoded. The preparation of UL data may be relaxed when something else (e.g., a DMRS pilot signal, or a common UL burst (e.g., a UL burst carrying unscheduled UL transmission, such as a sounding reference signal (SRS))) can be transmitted before the first symbol period of the UL data transmission.

Figure 10:
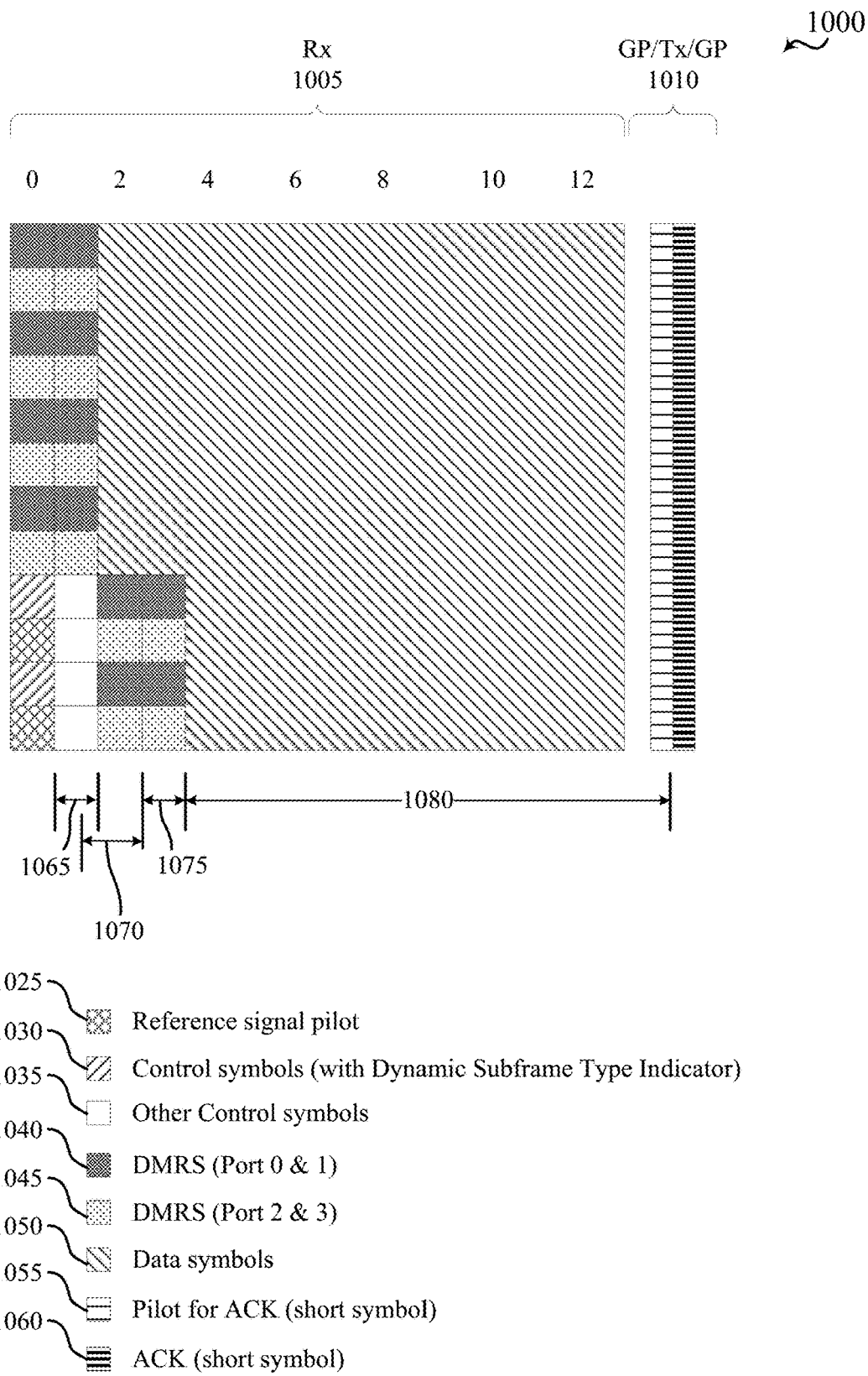
FIG. 10 illustrates an example of resources and UE process timing for a subframe associated with a DL-centric dynamic subframe type, in accordance with one or more aspects of the present disclosure.

FIG. 10 illustrates an example of resources and UE process timing for a subframe 1000 associated with a DL-centric dynamic subframe type, in accordance with one or more aspects of the present disclosure. In some examples, FIG. 10 may represent aspects of processing performed by a modem of a UE 115 described with reference to FIG. 1.

In the example of FIG. 10, a DL portion 1005 of the subframe 1000 may be received at a UE, followed by a guard period and UL portion 1010 of the subframe. The DL portion 1005 received at the UE in this example may include a temporally first symbol period that may include reference signal (e.g., CRS) pilot resource elements (REs) 1025, control symbol REs 1030 (including a dynamic subframe type indicator) embedded with the reference signal pilot REs 1025, and DMRS REs 1040 and 1045. The control symbol REs 1030 may include physical DL control channel (PDCCH) information that includes a resource allocation and processing parameters such as a modulation and coding scheme (MCS), new data indicator (NDI), and redundancy version (RV), for data symbols 1050. A temporally second symbol period received at the UE in this example may include other control symbol REs 1035 and DMRS REs 1040 and 1045. In some examples, other control symbol REs 1035 may be included in control bandwidth but may not contain PDCCH information. After data symbols 1050, the subframe 1000 may include a guard period, and a UL pilot 1055 and UL ACK/NACK symbol period 1060 in the UL portion 1010. The subframe 1000 may conclude with a final guard period.

During time period 1065, a UE may process the reference signal and dynamic subframe type indicator received in the first symbol period of the subframe 1000. At this point, the dynamic subframe type may be unknown. After the dynamic subframe type is known, the UE may decode the PDCCH and search for a DL assignment. This may occur during time period 1070. Upon decoding a DL assignment, the resource block (RB) allocation for the DL assignment may be known, and DMRS processing may begin (e.g., during time period 1075). Alternatively, DMRS processing may begin prior to knowing the RB allocation. However, this may waste processing resources by processing of unallocated RBs. Following DMRS processing, the data region of the DL portion 1005 may be processed (e.g., during time period 1080). Because data may be transmitted during the temporally third and fourth symbol periods of the subframe 1000, some catching up in terms of data symbol processing may be performed (e.g., processing twelve symbols in about the time of eleven symbols). However, when PDCCH and DMRS can be fit into the second symbol period, no catching up of data symbol processing may be needed. In FIG. 10, a cyclic prefix (CP) may be a part of each symbol, and is therefore not shown explicitly.

Figure 11:
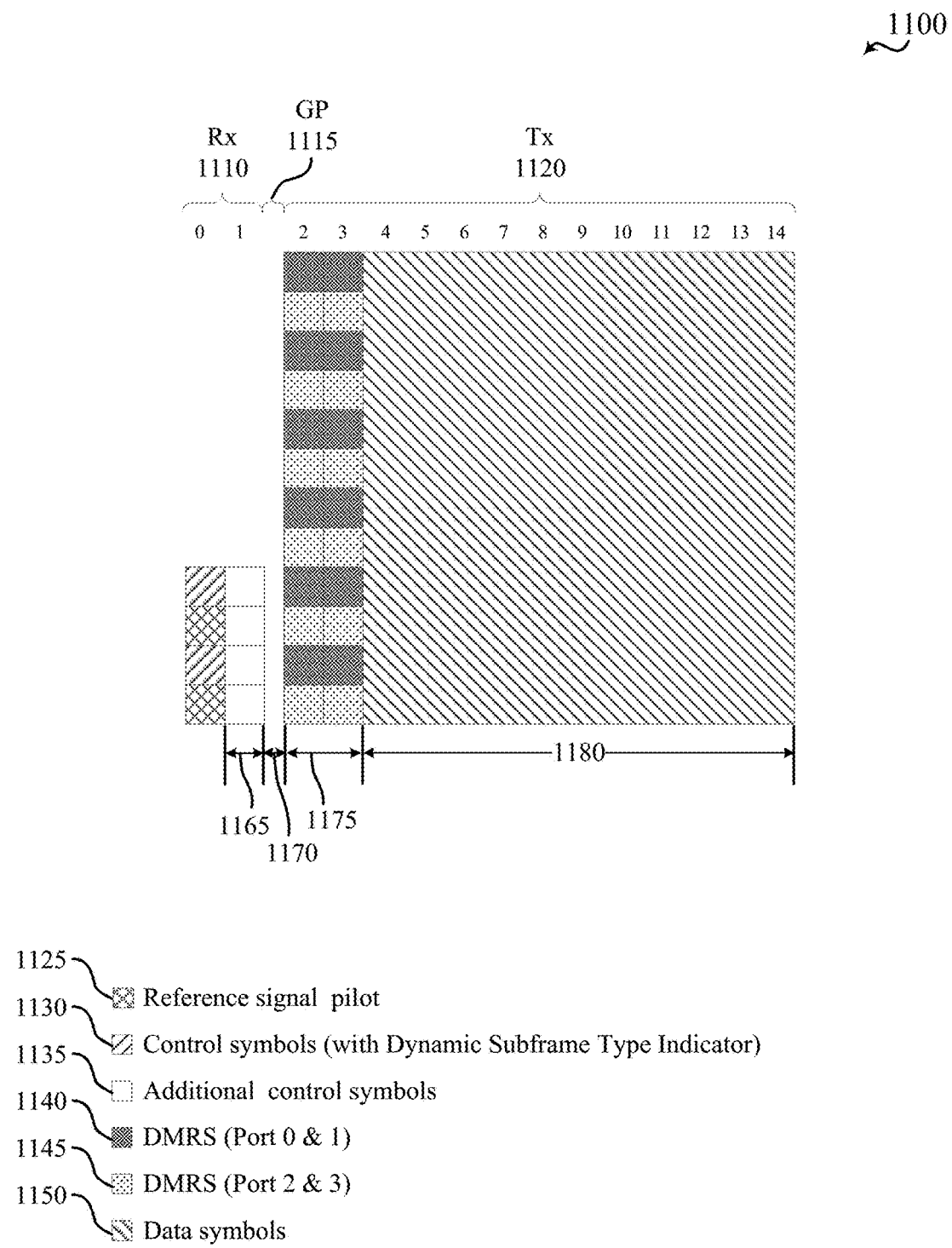
FIG. 11 illustrates an example of resources and UE process timing for a subframe associated with a UL-centric dynamic subframe type, in accordance with one or more aspects of the present disclosure.

FIG. 11 illustrates an example of resources and UE process timing for a subframe 1100 associated with a UL-centric dynamic subframe type, in accordance with one or more aspects of the present disclosure. In some examples, FIG. 11 may represent aspects of processing performed by a modem of a UE 115 described with reference to FIG. 1.

In the example of FIG. 11, a DL portion 1110 of the subframe 1100 may be received at a UE, followed by a guard period 1115 and a UL portion 1120 of the subframe 1100. The DL portion 1110 received at the UE in this example may include a temporally first symbol period that may include reference signal pilot REs 1125, and control symbol REs 1130 (including a dynamic subframe type indicator) embedded within the reference signal pilot REs 1125. The control symbol REs 1130 may also include a UL grant for the UE. A temporally second symbol period received at the UE in this example may include additional control symbol REs 1135. The additional control symbol REs 1135 may include PDCCH information that includes a resource allocation and processing parameters such as an MCS for data symbols 1150. In some examples, additional control symbol REs 1135 may be included in control bandwidth but may not contain PDCCH information. Following the guard period 1115, DMRS REs 1140 and 1145 may be transmitted in the first two UL symbol periods of a UL data region, followed by UL data symbols 1150.

During a time period 1165, a UE may process the reference signal and dynamic subframe type indicator received in the first symbol period of the subframe 1100. At this point, the dynamic subframe type may be unknown. After the dynamic subframe type is known, the UE may decode the PDCCH and search for a UL grant. This may occur during the time period 1170. RF switching, from receive mode to transmit mode, may also occur during time period 1170. Upon decoding a UL grant, the RB allocation for the UL grant is known, and DMRS processing/transmission may begin (e.g., during the time period 1175). Alternatively, partial pre-processing of the DMRS may begin prior to knowing the RB allocation. However, this may waste processing resources by processing DMRS for unallocated RBs. UL data symbol processing (e.g., encoding and modulation for a first one or more data symbols) may also begin during time period 1175. Following DMRS processing, the data region of the UL portion 1120 may be processed and transmitted (e.g., during time period 1180). In FIG. 11, a CP may be a part of each symbol, and is therefore not shown explicitly.

Figure 12:
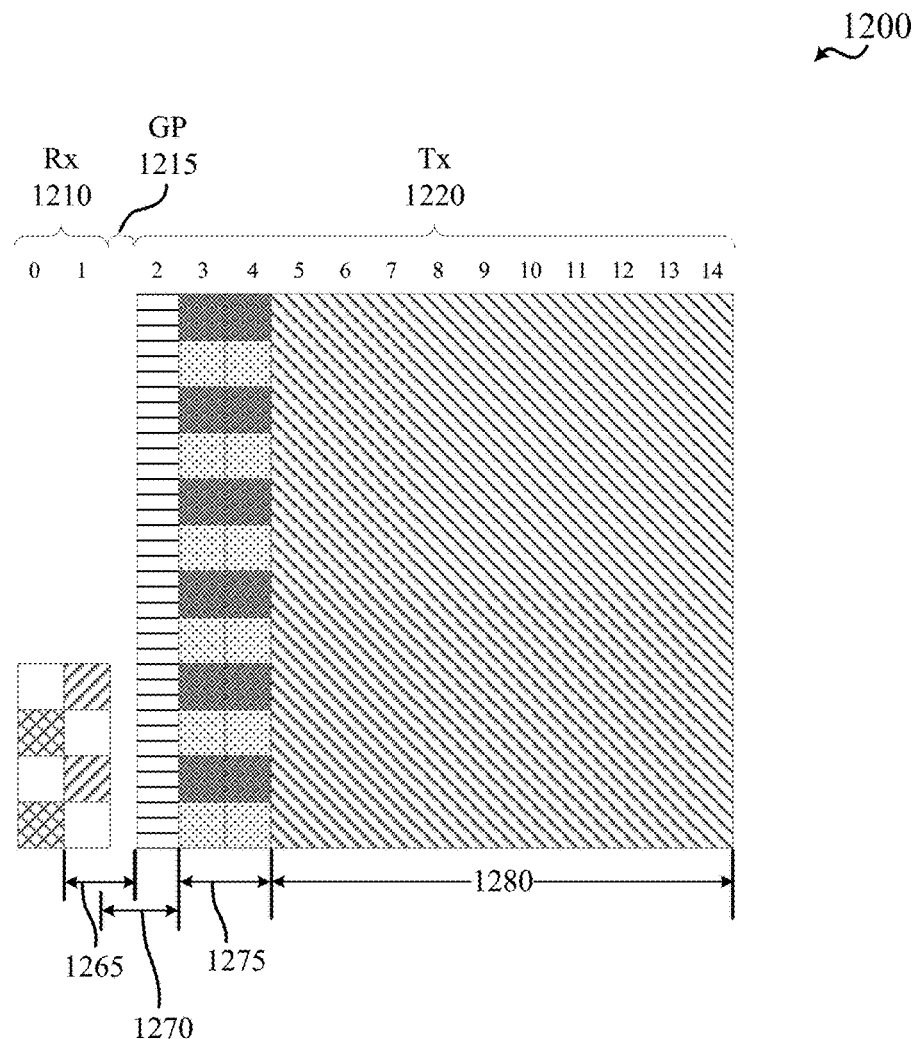
FIG. 12 illustrates an example of resources and UE process timing for a subframe associated with a UL-centric dynamic subframe type, in accordance with one or more aspects of the present disclosure.

FIG. 12 illustrates an example of resources and UE process timing for a subframe 1200 associated with a UL-centric dynamic subframe type, in accordance with one or more aspects of the present disclosure. In some examples, FIG. 12 may represent aspects of processing performed by a modem of a UE 115 described with reference to FIG. 1.

In the example of FIG. 12, a DL portion 1210 of the subframe 1200 may be received at a UE, followed by a guard period 1215, a non-time critical UL burst 1255, and a UL portion 1220 of the subframe 1200. The DL portion 1210 received at the UE in this example may include a temporally first symbol period that may include reference signal pilot REs 1225, and control symbol REs 1230 (including a dynamic subframe type indicator) embedded within the reference signal pilot REs 1225. The control symbol REs 1230 may also include a UL grant for the UE. A temporally second symbol period received at the UE in this example may include additional control symbols 1235.

Following the guard period 1215, the non-time critical UL burst 1255 may be transmitted in a first symbol period of a UL data region. The non-time critical UL burst 1255 may be prepared in advance, and may provide the UE with additional processing time to prepare a DMRS and/or UL data symbols 1250 for transmission in the UL data region (or UL portion 1220). In some examples, the non-time critical UL burst 1255 may include an unscheduled (or a-priori scheduled) UL transmission, such as an SRS or channel quality indicator (CQI). DMRS REs 1240 and 1245 may be transmitted in the second and third UL symbol periods of the UL data region, followed by UL data symbols 1250. The additional control symbol REs 1235 may include PDCCH information that includes a resource allocation and processing parameters such as an MCS for data symbols 1250. In some examples, additional control symbol REs 1235 may be included in control bandwidth but may not contain PDCCH information.

During a time period 1265, a UE may process the reference signal and dynamic subframe type indicator received in the first symbol period of the subframe 1200. At this point, the dynamic subframe type is unknown. After the dynamic subframe type is known, the UE may decode the PDCCH and search for a UL grant. This may occur during the time period 1270, which may be longer than the time period 1170 described with reference to FIG. 11 because of transmission of the non-time critical UL burst 1255. RF switching, from receive mode to transmit mode, may also occur during time period 1170. Upon decoding a UL grant, the RB allocation for the UL grant is known, and DMRS processing/transmission may begin (e.g., during the time period 1275). Alternatively, partial pre-processing of the DMRS may begin prior to knowing the RB allocation. However, this may waste processing resources because of DMRS processing for unallocated RBs. UL data symbol processing (e.g., encoding and modulation for a first one or more data symbols) may also begin during time period 1275. Following DMRS processing, the data region of the UL portion 1220 may be processed and transmitted (e.g., during time period 1280). In FIG. 12, a cyclic prefix (CP) may be a part of each symbol, and is therefore not shown explicitly.

Because HARQ feedback is dependent on the direction of data transmission in a subframe, the selection of a dynamic subframe type for a subframe may be used as a basis for allocating HARQ resources for the subframe. When a subframe is self-contained, HARQ resources may be allocated within the subframe. For a subframe associated with a DL-centric dynamic subframe type, a HARQ transmission period (e.g., a UL transmission period) may be allocated for the subframe at an end of the subframe. For a subframe associated with a UL-centric dynamic subframe type, a HARQ transmission period (e.g., a DL transmission period) may be allocated for the subframe at an end of the subframe, or at least one HARQ transmission resource for the subframe may be allocated in a DL control region of a subsequent subframe.

When a subframe includes at least one DL data region and at least one UL data region, at least one DL HARQ transmission resource may be allocated for the subframe and at least one UL HARQ transmission resource may be allocated for the subframe in the subframe (or the at least one DL HARQ transmission resource may be allocated in a DL control region of a subsequent subframe).

Figure 13:
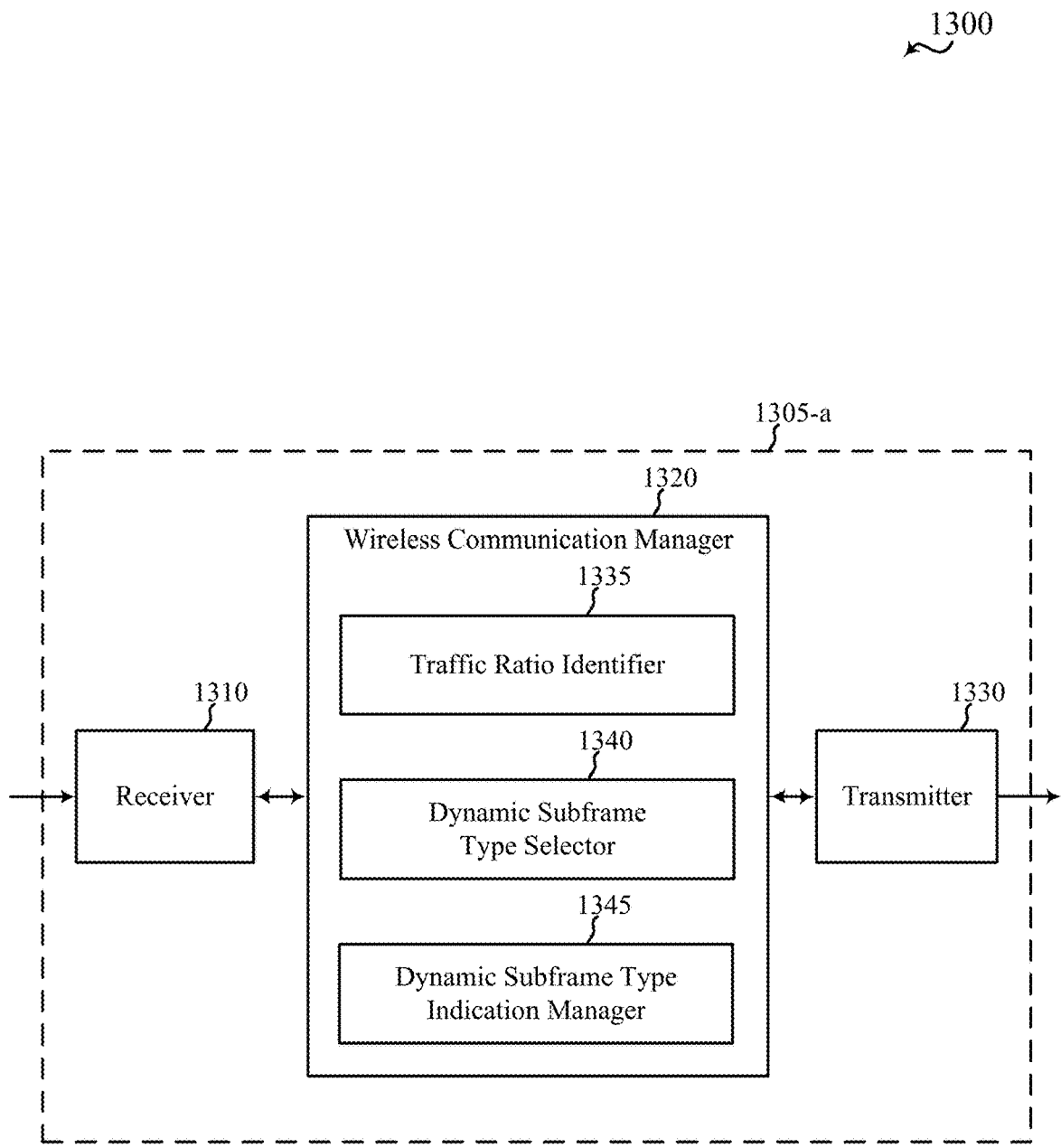
FIG. 13 shows a block diagram of an apparatus for use in wireless communication, in accordance with one or more aspects of the present disclosure.

FIG. 13 shows a block diagram 1300 of an apparatus 1305 for use in wireless communication, in accordance with one or more aspects of the present disclosure. The apparatus 1305 may be an example of aspects of one or more of the network access devices 105 described with reference to FIG. 1. The apparatus 1305 may also be, or include, a processor. The apparatus 1305 may include a receiver 1310, a wireless communication manager 1320, or a transmitter 1330. Each of these components may be in communication with each other.

The components of the apparatus 1305 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits (ICs). In some other examples, other types of integrated circuits may be used (e.g., Structured/Platform ASICs, Field Programmable Gate Arrays (FPGAs), a System-on-Chip (SoC), and/or other types of semi-custom ICs), which may be programmed in any manner known in the art. The functions of each component may also be implemented, in whole or in part, with instructions stored in a memory, formatted to be executed by one or more general or application-specific processors.

In some examples, the receiver 1310 may include at least one RF receiver, such as at least one RF receiver operable to receive transmissions over one or more radio frequency spectrum bands. In some examples, the one or more radio frequency spectrum bands may be used for LTE/LTE-A or 5G communications, as described, for example, with reference to FIGS. 1 through 12. The receiver 1310 may be used to receive various types of data or control signals (i.e., transmissions) over one or more communication links of a wireless communication system, such as one or more communication links of the wireless communication system 100 described with reference to FIG. 1.

In some examples, the transmitter 1330 may include at least one RF transmitter, such as at least one RF transmitter operable to transmit over one or more radio frequency spectrum bands. In some examples, the one or more radio frequency spectrum bands may be used for LTE/LTE-A or 5G communications, as described, for example, with reference to FIGS. 1 through 12. The transmitter 1330 may be used to transmit various types of data or control signals (i.e., transmissions) over one or more communication links of a wireless communication system, such as one or more communication links of the wireless communication system 100 described with reference to FIG. 1.

In some examples, the wireless communication manager 1320 may be used to manage one or more aspects of wireless communication for the apparatus 1305. In some examples, part of the wireless communication manager 1320 may be incorporated into or shared with the receiver 1310 or the transmitter 1330. In some examples, the wireless communication manager 1320 may be an example of aspects of the network access device wireless communication manager described with reference to FIG. 1. In some examples, the wireless communication manager 1320 may include a traffic ratio identifier 1335, a dynamic subframe type selector 1340, or a dynamic subframe type indication manager 1345.

The traffic ratio identifier 1335 may be used to identify a UL/DL traffic ratio associated with data to be transmitted between a network access device including the apparatus 1305 and at least one UE. In some examples, the UL/DL traffic ratio may include a ratio of traffic queued for transmission to the network access device and traffic queued for transmission to at least one UE.

The dynamic subframe type selector 1340 may be used to select, based at least in part on a traffic condition (e.g., the UL/DL traffic ratio), a dynamic subframe type of a TDD subframe. In some examples, the dynamic subframe type may be selected from a set of dynamic subframe types including two or more of: a DL-centric dynamic subframe type, a UL-centric dynamic subframe type, a bi-directional dynamic subframe type, a full-duplex dynamic subframe type, a dynamic switch dynamic subframe type, a mixed interference measurement dynamic subframe type, or a distributed scheduling dynamic subframe type.

The dynamic subframe type indication manager 1345 may be used to indicate the dynamic subframe type in a TDD header of the subframe. In some examples, the dynamic subframe type may be indicated within a temporally first symbol period of the subframe. In some examples, indicating the dynamic subframe type may include at least one of: embedding an indication of the dynamic subframe type in a reference signal, transmitting the indication of the dynamic subframe type in a subframe type indicator channel, or transmitting a type of DCI corresponding to the dynamic subframe type. In some examples, indicating the dynamic subframe type may include at least one of broadcasting the dynamic subframe type to UEs associated with a cell, or unicasting the dynamic subframe type to a subset of UEs associated with the cell. In some examples, indicating the dynamic subframe type may include transmitting an indication of the dynamic subframe type within a narrow band of frequencies of a system bandwidth, as described with reference to FIG. 3. In some examples, indicating the dynamic subframe type may include transmitting at least one of: a first bit indicating a UL data transmission direction or a DL data transmission direction, or a second bit indicating a half-duplex data transmission or a full-duplex data transmission, or a combination thereof.

Figure 14:
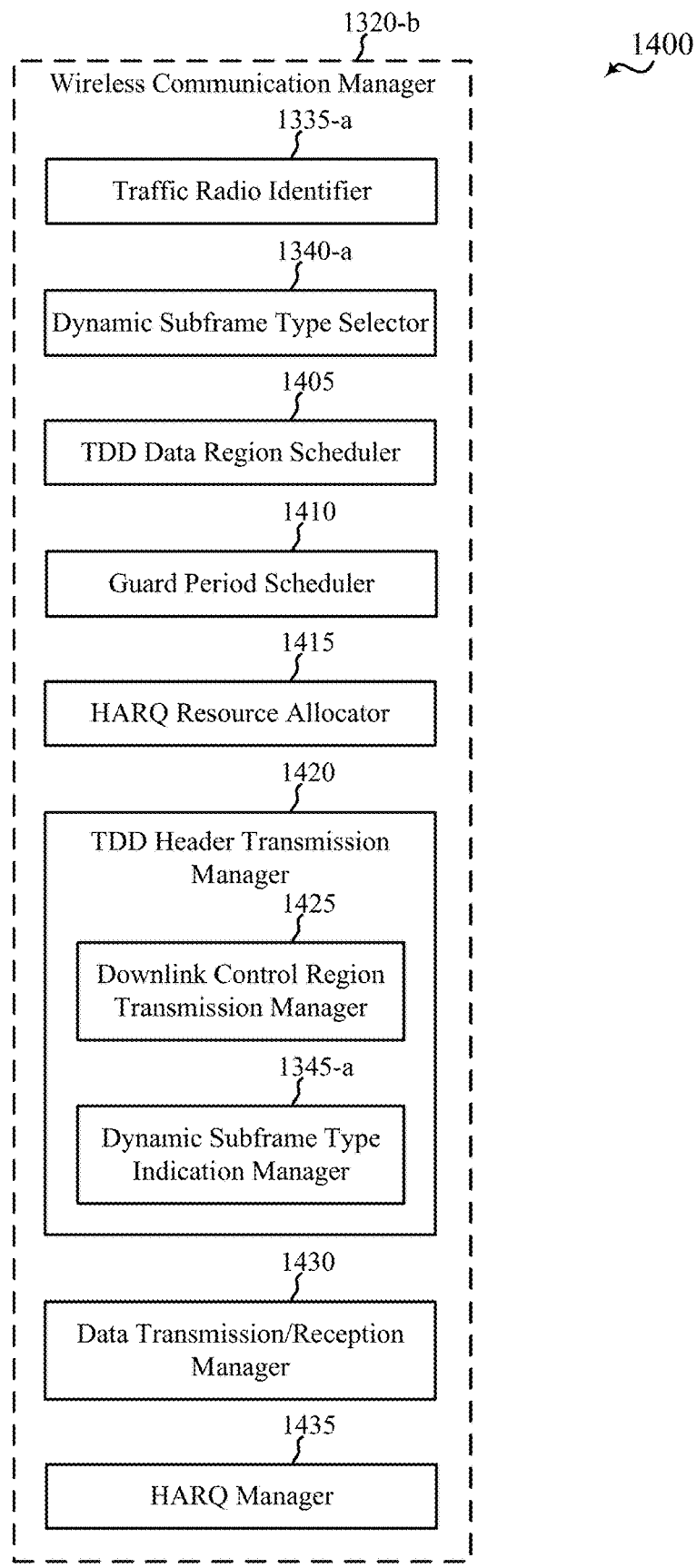
FIG. 14 shows a block diagram of a wireless communication manager for use in wireless communication, in accordance with one or more aspects of the present disclosure.

FIG. 14 shows a block diagram 1400 of a wireless communication manager 1320-*b* for use in wireless communication, in accordance with one or more aspects of the present disclosure. The wireless communication manager 1320-*b* may be an example of aspects of the wireless communication manager 1320 described with reference to FIG. 1 or 13.

The components of the wireless communication manager 1320-*b* may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions stored in a memory, formatted to be executed by one or more general or application-specific processors.

In some examples, the wireless communication manager 1320-*b* may be used to manage one or more aspects of wireless communication for a UE or apparatus, such as one of the network access devices 105 or apparatuses 1305 described with reference to FIG. 1 or 13. In some examples, part of the wireless communication manager 1320-*b* may be incorporated into or shared with a receiver or a transmitter (e.g., the receiver 1310 or the transmitter 1330 described with reference to FIG. 13). In some examples, the wireless communication manager 1320-*b* may include a traffic ratio identifier 1335-*a*, a dynamic subframe type selector 1340-*a*, a TDD data region scheduler 1405, a guard period scheduler 1410, a HARQ resource allocator 1415, a TDD header transmission manager 1420, a data transmission/reception manager 1430, or a HARQ manager 1435.

The traffic ratio identifier 1335 may be used to identify a UL/DL traffic ratio associated with data to be transmitted between a network access device including the wireless communication manager 1320-*b* and at least one UE. In some examples, the UL/DL traffic ratio may include a ratio of traffic queued for transmission to the network access device and traffic queued for transmission to the at least one UE.

The dynamic subframe type selector 1340 may be used to select, based at least in part on a traffic condition (e.g., the UL/DL traffic ratio), a dynamic subframe type of a TDD subframe. In some examples, the dynamic subframe type may be selected from a set of dynamic subframe types including two or more of: a DL-centric dynamic subframe type, a UL-centric dynamic subframe type, a bi-directional dynamic subframe type, a full-duplex dynamic subframe type, a dynamic switch dynamic subframe type, a mixed interference measurement dynamic subframe type, or a distributed scheduling dynamic subframe type.

The TDD data region scheduler 1405 may be used to schedule a data region of the TDD subframe based at least in part on the selected dynamic subframe type. The guard period scheduler 1410 may be used to schedule a guard period, between a DL control region of the subframe and the data region, when the selected dynamic subframe type is associated with a data region having a UL portion (which UL portion may in some examples include the entire data region).

The HARQ resource allocator 1415 may be used to allocate a HARQ transmission period for the subframe at an end of the subframe, allocate at least one HARQ transmission resource for the subframe in a DL control region of a subsequent subframe, or allocate at least one DL HARQ transmission resource for the subframe and at least one UL HARQ transmission resource for the subframe in the subframe.

The TDD header transmission manager 1420 may be used to transmit a TDD header of the subframe. The TDD header may include the DL control region and an indication of the dynamic subframe type. In some examples, the TDD header transmission manager 1420 may include a DL control region transmission manager 1425 to manage transmission of the DL control region, or a dynamic subframe type indication manager 1345-*a* to manage transmission of the indication of the dynamic subframe type. In some examples, the indication of the dynamic subframe type may be transmitted in the DL control region. In some examples, the DL control region may be transmitted within a temporally first symbol period of the subframe, or within the temporally first symbol period of the TDD subframe and a temporally second symbol period of the TDD subframe. In some examples, the dynamic subframe type may be indicated within the temporally first symbol period of the TDD subframe.

In some examples, indicating the dynamic subframe type may include at least one of: embedding an indication of the dynamic subframe type in a reference signal, transmitting the indication of the dynamic subframe type in a subframe type indicator channel, or transmitting a type of DCI corresponding to the dynamic subframe type. In some examples, indicating the dynamic subframe type may include at least one of broadcasting the dynamic subframe type to UEs associated with a cell, or unicasting the dynamic subframe type to a subset of UEs associated with the cell. In some examples, indicating the dynamic subframe type may include transmitting an indication of the dynamic subframe type within a narrow band of frequencies of a system bandwidth, as described with reference to FIG. 3. In some examples, indicating the dynamic subframe type may include transmitting at least one of: a first bit indicating a UL data transmission direction or a DL data transmission direction, or a second bit indicating a half-duplex data transmission or a full-duplex data transmission, or a combination thereof. The data transmission/reception manager 1430 may be used to transmit and/or receive data in the scheduled data region. The HARQ manager 1435 may be used to transmit and/or receive at least one HARQ transmission on a HARQ resource scheduled by the HARQ resource allocator 1415.

Figure 15:
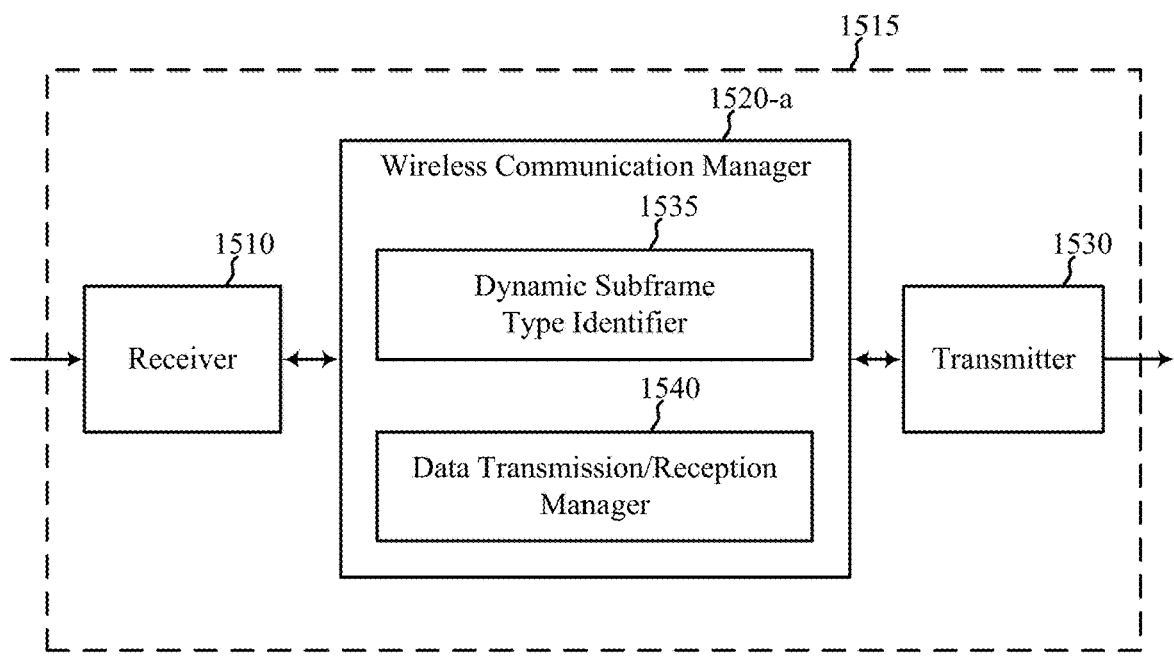
FIG. 15 shows a block diagram of an apparatus for use in wireless communication, in accordance with one or more aspects of the present disclosure.

FIG. 15 shows a block diagram 1500 of an apparatus 1515 for use in wireless communication, in accordance with one or more aspects of the present disclosure. The apparatus 1515 may be an example of aspects of one or more of the UEs 115 described with reference to FIG. 1. The apparatus 1515 may also be or include a processor. The apparatus 1515 may include a receiver 1510, a wireless communication manager 1520-*a*, or a transmitter 1530. Each of these components may be in communication with each other.

The components of the apparatus 1515 may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of semi-custom ICs), which may be programmed in any manner known in the art. The functions of each component may also be implemented, in whole or in part, with instructions stored in a memory, formatted to be executed by one or more general or application-specific processors.

In some examples, the receiver 1510 may include at least one RF receiver, such as at least one RF receiver operable to receive transmissions over one or more radio frequency spectrum bands. In some examples, the one or more radio frequency spectrum bands may be used for LTE/LTE-A or 5G communications, as described, for example, with reference to FIGS. 1 through 12. The receiver 1510 may be used to receive various types of data or control signals (i.e., transmissions) over one or more communication links of a wireless communication system, such as one or more communication links of the wireless communication system 100 described with reference to FIG. 1.

In some examples, the transmitter 1530 may include at least one RF transmitter, such as at least one RF transmitter operable to transmit over one or more radio frequency spectrum bands. In some examples, the one or more radio frequency spectrum bands may be used for LTE/LTE-A or 5G communications, as described, for example, with reference to FIGS. 1 through 12. The transmitter 1530 may be used to transmit various types of data or control signals (i.e., transmissions) over one or more communication links of a wireless communication system, such as one or more communication links of the wireless communication system 100 described with reference to FIG. 1.

In some examples, the wireless communication manager 1520-*a* may be used to manage one or more aspects of wireless communication for the apparatus 1515. In some examples, part of the wireless communication manager 1520-*a* may be incorporated into or shared with the receiver 1510 or the transmitter 1530. In some examples, the wireless communication manager 1520-*a* may be an example of aspects of the UE wireless communication manager 1520 described with reference to FIG. 1. In some examples, the wireless communication manager 1520-*a* may include a dynamic subframe type identifier 1535 or a data transmission/reception manager 1540.

The dynamic subframe type identifier 1535 may be used to identify, in a TDD header of a TDD subframe, an indication of a dynamic subframe type of the TDD subframe. In some examples, the dynamic subframe type may include: a DL-centric dynamic subframe type, a UL-centric dynamic subframe type, a bi-directional dynamic subframe type, a full-duplex dynamic subframe type, a dynamic switch dynamic subframe type, a mixed interference measurement dynamic subframe type, or a distributed scheduling dynamic subframe type. In some examples, the dynamic subframe type may be identified within a temporally first symbol period of the subframe. In some examples, the dynamic subframe type may be identified based at least in part on at least one of: an indication of the dynamic subframe type embedded in a reference signal, an indication of the dynamic subframe type received in a subframe type indicator channel, or a type of received DCI.

In some examples, the dynamic subframe type may be received in at least one of broadcast control information or unicast control information. In some examples, identifying the dynamic subframe type may include identifying an indication of the dynamic subframe type within a narrow band of frequencies of a system bandwidth, as described with reference to FIG. 3. In some examples, identifying the dynamic subframe type may include receiving at least one of: a first bit indicating a UL data transmission direction or a DL data transmission direction, or a second bit indicating a half-duplex data transmission or a full-duplex data transmission, or a combination thereof. The data transmission/reception manager 1540 may be used to transmit data or receiving data in a data region of the subframe based at least in part on the dynamic subframe type.

Figure 16:
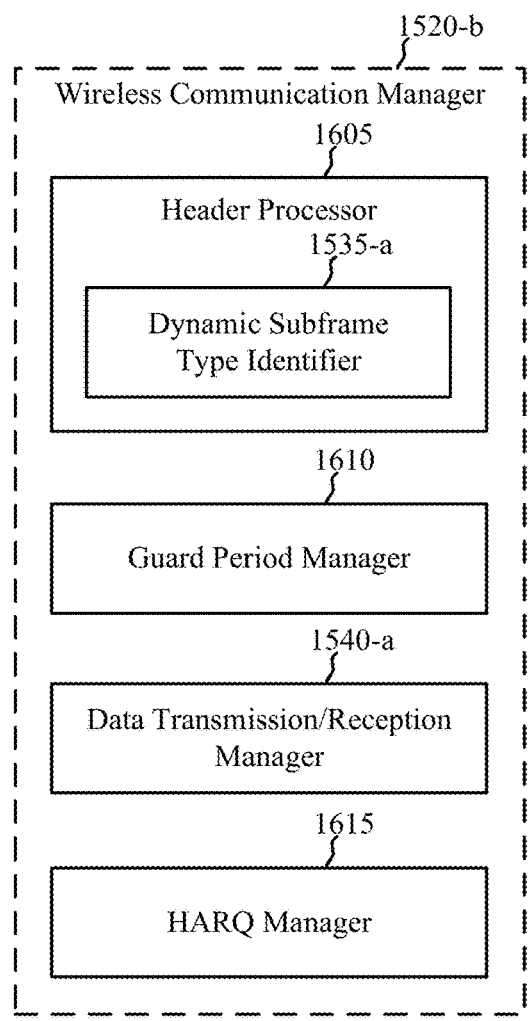
FIG. 16 shows a block diagram of a wireless communication manager for use in wireless communication, in accordance with one or more aspects of the present disclosure.

FIG. 16 shows a block diagram 1600 of a wireless communication manager 1520-*b* for use in wireless communication, in accordance with one or more aspects of the present disclosure. The wireless communication manager 1520-*a* may be an example of aspects of the wireless communication manager 1520 described with reference to FIG. 1 or 15.

The components of the wireless communication manager 1520-*a* may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of semi-custom ICs), which may be programmed in any manner known in the art. The functions of each component may also be implemented, in whole or in part, with instructions stored in a memory, formatted to be executed by one or more general or application-specific processors.

In some examples, the wireless communication manager 1520-*a* may be used to manage one or more aspects of wireless communication for a UE or apparatus, such as one of the UEs 115 or apparatuses 1515 described with reference to FIG. 1 or 15. In some examples, part of the wireless communication manager 1520-*a* may be incorporated into or shared with a receiver or a transmitter (e.g., the receiver 1510 or the transmitter 1530 described with reference to FIG. 15). In some examples, the wireless communication manager 1520-*a* may include a header processor 1605, a guard period manager 1610, a data transmission/reception manager 1540, or a HARQ manager 1615.

The header processor 1605 may be used to receive a TDD header of a TDD subframe. The TDD header may include a DL control region and an indication of a dynamic subframe type of the TDD subframe. In some examples, the indication of the dynamic subframe type may be received in the DL control region. In some examples, the DL control region may be received within a temporally first symbol period of the TDD subframe, or within the temporally first symbol period of the TDD subframe and a temporally second symbol period of the TDD subframe.

In some examples, the header processor 1605 may include a dynamic subframe type identifier 1535. The dynamic subframe type identifier 1535 may be used to identify, in the TDD header (and in some examples, in the DL control region), the indication of the dynamic subframe type. In some examples, the dynamic subframe type may include: a DL-centric dynamic subframe type, a UL-centric dynamic subframe type, a bi-directional dynamic subframe type, a full-duplex dynamic subframe type, a dynamic switch dynamic subframe type, a mixed interference measurement dynamic subframe type, or a distributed scheduling dynamic subframe type. In some examples, the dynamic subframe type may be identified within a temporally first symbol period of the TDD subframe.

In some examples, the dynamic subframe type may be identified based at least in part on at least one of: an indication of the dynamic subframe type embedded in a reference signal, an indication of the dynamic subframe type received in a subframe type indicator channel, or a type of received DCI. In some examples, the dynamic subframe type may be received in at least one of broadcast control information or unicast control information. In some examples, identifying the dynamic subframe type may include identifying an indication of the dynamic subframe type within a narrow band of frequencies of a system bandwidth, as described with reference to FIG. 3. In some examples, identifying the dynamic subframe type may include receiving at least one of: a first bit indicating a UL data transmission direction or a DL data transmission direction, or a second bit indicating a half-duplex data transmission or a full-duplex data transmission, or a combination thereof.

The guard period manager 1610 may be used to refrain from transmitting during a guard period, between the DL control region and the data region, when the identified dynamic subframe type is associated with a data region having a UL portion (which UL portion may in some examples include the entire data region). The data transmission/reception manager 1540 may be used to transmit data or receiving data in a data region of the subframe based at least in part on the dynamic subframe type.

The HARQ manager 1615 may be used to identify an allocation of a HARQ transmission period for the TDD subframe at an end of the TDD subframe, an allocation of at least one HARQ transmission resource for the subframe in a DL control region of a subsequent TDD subframe, or an allocation of at least one DL HARQ transmission resource for the TDD subframe and at least one UL HARQ transmission resource for the TDD subframe in the TDD subframe. The HARQ manager 1615 may also be used to transmit and/or receive at least one HARQ transmission on an allocated HARQ resource.

Figure 17:
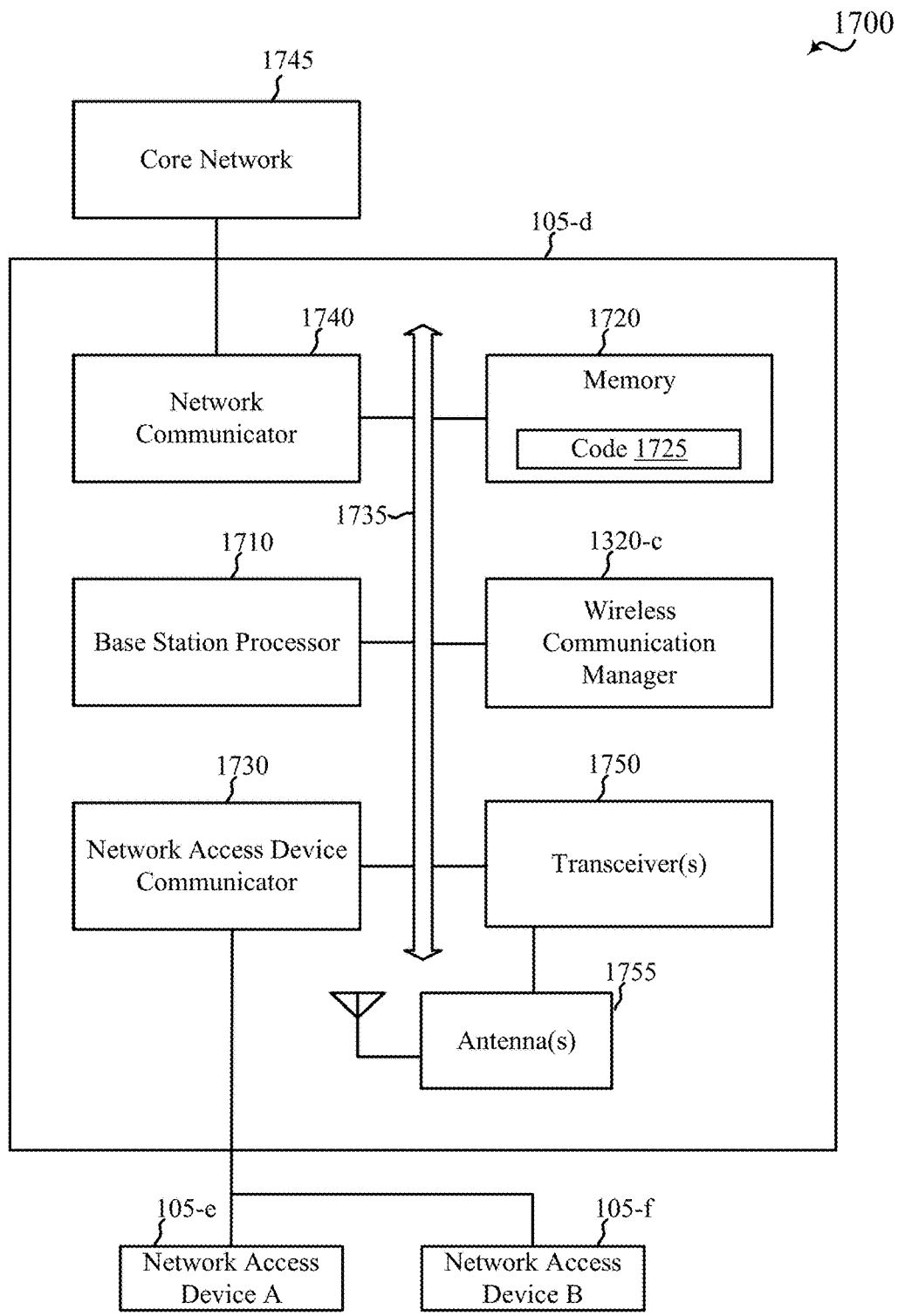
FIG. 17 shows a block diagram of a network access device for use in wireless communication, in accordance with one or more aspects of the present disclosure.

FIG. 17 shows a block diagram 1700 of a network access device 105-*d* for use in wireless communication, in accordance with one or more aspects of the present disclosure. In some examples, the network access device 105-*d* may be an example of one or more aspects of a network access device (e.g., an eNB, an ANC, a RH, or a base station) described with reference to FIG. 1, or aspects of the apparatus 1305 described with reference to FIG. 13. The network access device 105-*d* may be configured to implement or facilitate at least some of the network access device techniques and functions described with reference to FIGS. 1 through 14.

The network access device 105-*d* may include a base station processor 1710, a memory 1720, at least one transceiver (represented by transceiver(s) 1750), at least one antenna (represented by base station antenna(s) 1755), or a wireless communication manager 1320-*c*. The network access device 105-*d* may also include one or more of a network access device communicator 1730 or a network communicator 1740. Each of these components may be in communication with each other, directly or indirectly, over one or more buses 1735.

The memory 1720 may include random access memory (RAM) or read-only memory (ROM). The memory 1720 may store computer-readable, computer-executable code 1725 containing instructions that are configured to, when executed, cause the processor 1710 to perform various functions described herein related to wireless communication, including, for example, identifying a traffic condition associated with data to be transmitted between a network access device and at least one UE; selecting, based at least in part on the traffic condition, a dynamic subframe type of a TDD subframe; and indicating the dynamic subframe type in a TDD header of the TDD subframe. Alternatively, the computer-executable code 1725 may not be directly executable by the processor 1710 but be configured to cause the network access device 105-*d* (e.g., when compiled and executed) to perform various of the functions described herein.

The processor 1710 may include an intelligent hardware device, e.g., a central processing unit (CPU), a microcontroller, an ASIC, etc. The processor 1710 may process information received through the transceiver(s) 1750, the network access device communicator 1730, or the network communicator 1740. The processor 1710 may also process information to be sent to the transceiver(s) 1750 for transmission through the antenna(s) 1755, to the network access device communicator 1730, for transmission to one or more other network access devices (e.g., network access device 105-*e* and network access device 105-*f*), or to the network communicator 1740 for transmission to a core network 1745, which may be an example of one or more aspects of the core network 130 described with reference to FIG. 1. The processor 1710 may handle, alone or in connection with the wireless communication manager 1320-*c*, various aspects of communicating over (or managing communications over) one or more radio frequency spectrum bands.

The transceiver(s) 1750 may include a modem configured to modulate packets and provide the modulated packets to the antenna(s) 1755 for transmission, and to demodulate packets received from the antenna(s) 1755. The transceiver(s) 1750 may, in some examples, be implemented as one or more transmitters and one or more separate receivers. The transceiver(s) 1750 may support communications in one or more radio frequency spectrum bands. The transceiver(s) 1750 may be configured to communicate bi-directionally, via the antenna(s) 1755, with one or more UEs or apparatuses, such as one or more of the UEs 115 described with reference to FIG. 1, or one or more of the apparatus 1515 described with reference to FIG. 15. The network access device 105-*d* may, for example, include multiple antennas 1755 (e.g., an antenna array). The network access device 105-*d* may communicate with the core network 1745 through the network communicator 1740. The network access device 105-*d* may also communicate with other network access devices, such as the network access device 105-*e* and the network access device 105-*f*, using the network access device communicator 1730.

The wireless communication manager 1320-*c* may be configured to perform or control some or all of the techniques or functions described with reference to FIGS. 1 through 14 related to wireless communication over one or more radio frequency spectrum bands. The wireless communication manager 1320-*c*, or portions of it, may include a processor, or some or all of the functions of the wireless communication manager 1320-*c* may be performed by the processor 1710 or in connection with the processor 1710. In some examples, the wireless communication manager 1320-*c* may be an example of the wireless communication manager 1320 described with reference to FIG. 1, 13, or 14.

Figure 18:
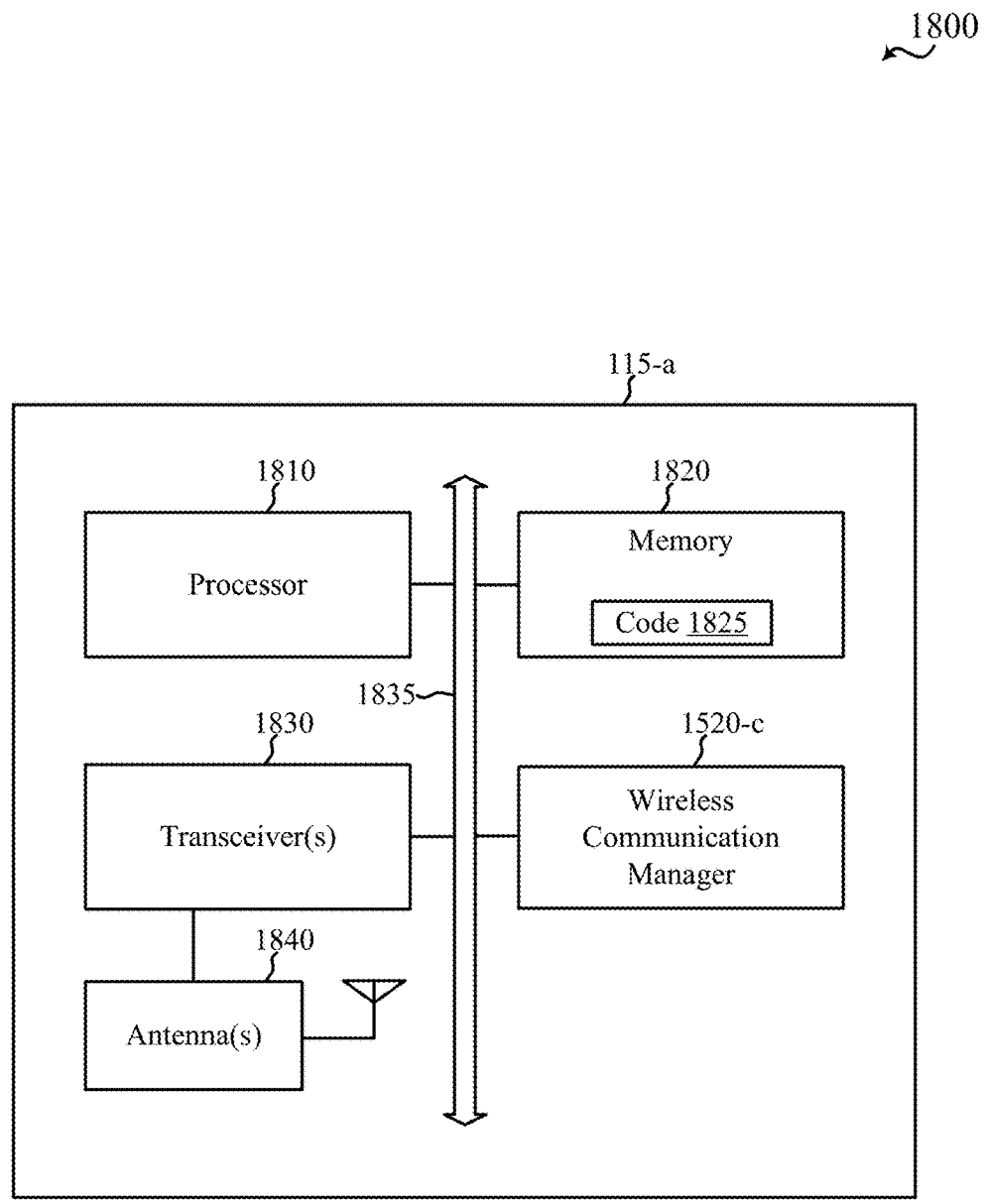
FIG. 18 shows a block diagram of a UE for use in wireless communication, in accordance with one or more aspects of the present disclosure.

FIG. 18 shows a block diagram 1800 of a UE 115-*a* for use in wireless communication, in accordance with one or more aspects of the present disclosure. The UE 115-*a* may be included or be part of a personal computer (e.g., a laptop computer, a netbook computer, a tablet computer, etc.), a cellular telephone, a PDA, a DVR, an internet appliance, a gaming console, an e-reader, a vehicle, a home appliance, a lighting or alarm control system, etc. The UE 115-*a* may, in some examples, have an internal power supply (not shown), such as a small battery, to facilitate mobile operation. In some examples, the UE 115-*a* may be an example of aspects of one or more of the UEs 115 described with reference to FIG. 1, or aspects of the apparatus 1515 described with reference to FIG. 15. The UE 115-*a* may be configured to implement at least some of the UE or apparatus techniques and functions described with reference to FIGS. 1 through 16.

The UE 115-*a* may include a processor 1810, a memory 1820, at least one transceiver (represented by transceiver(s) 1830), at least one antenna (represented by antenna(s) 1840), or a wireless communication manager 1520-*c*. Each of these components may be in communication with each other, directly or indirectly, over one or more buses 1835.

The memory 1820 may include RAM or ROM. The memory 1820 may store computer-readable, computer-executable code 1825 containing instructions that are configured to, when executed, cause the processor 1810 to perform various functions described herein related to wireless communication, including, for example, identifying, in a TDD header of a subframe, an indication of a dynamic subframe type of the TDD subframe, and transmitting data or receiving data during the TDD subframe based at least in part on the dynamic subframe type. Alternatively, the computer-executable code 1825 may not be directly executable by the processor 1810 but be configured to cause the UE 115-*a* (e.g., when compiled and executed) to perform various of the functions described herein.

The processor 1810 may include an intelligent hardware device, e.g., a CPU, a microcontroller, an ASIC, etc. The processor 1810 may process information received through the transceiver(s) 1830 or information to be sent to the transceiver(s) 1830 for transmission through the antenna(s) 1840. The processor 1810 may handle, alone or in connection with the wireless communication manager 1520-*c*, various aspects of communicating over (or managing communications over) one or more radio frequency spectrum bands.

The transceiver(s) 1830 may include a modem configured to modulate packets and provide the modulated packets to the antenna(s) 1840 for transmission, and to demodulate packets received from the antenna(s) 1840. The transceiver(s) 1830 may, in some examples, be implemented as one or more transmitters and one or more separate receivers. The transceiver(s) 1830 may support communications in one or more radio frequency spectrum bands. The transceiver(s) 1830 may be configured to communicate bi-directionally, via the antenna(s) 1840, with one or more of the network access devices 105 described with reference to FIG. 1 or 17, or one or more of the apparatus 1305 described with reference to FIG. 13. While the UE 115-*a* may include a single antenna, there may be examples in which the UE 115-*a* may include multiple antennas 1840.

The wireless communication manager 1520-*c* may be configured to perform or control some or all of the UE or apparatus techniques or functions described with reference to FIGS. 1 through 16 related to wireless communication over one or more radio frequency spectrum bands. The wireless communication manager 1520-*c*, or portions of it, may include a processor, or some or all of the functions of the wireless communication manager 1520-*c* may be performed by the processor 1810 or in connection with the processor 1810. In some examples, the wireless communication manager 1520-*c* may be an example of the wireless communication manager 1520 described with reference to FIG. 1, 15, or 16.

Figure 19:
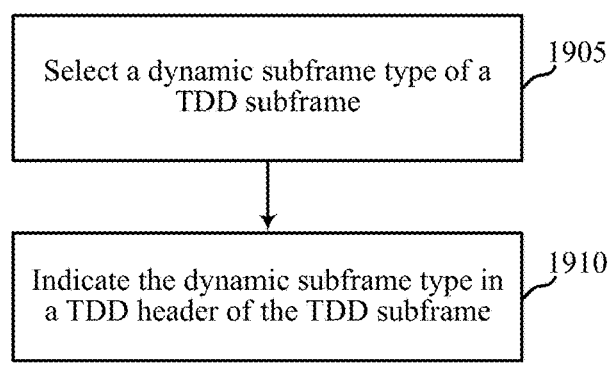
FIG. 19 is a flow chart illustrating an example of a method for wireless communication, in accordance with one or more aspects of the present disclosure.

FIG. 19 is a flow chart illustrating an example of a method 1900 for wireless communication, in accordance with one or more aspects of the present disclosure. For clarity, the method 1900 is described below with reference to aspects of a network access device 105 (e.g., an eNB, an ANC, an RH, or a base station) described with reference to FIG. 1 or 17, or aspects of the apparatus 1305 described with reference to FIG. 13, or aspects of the wireless communication manager 1320 described with reference to FIG. 1, 13, 14, or 17. In some examples, a network access device may execute one or more sets of codes to control the functional elements of the network access device to perform the functions described below. Additionally or alternatively, the network access device may perform one or more of the functions described below using special-purpose hardware.

At block 1905, the method 1900 may include selecting a dynamic subframe type of a TDD subframe. In some examples, the dynamic subframe type may be selected from a set of dynamic subframe types including two or more of: a DL-centric dynamic subframe type, a UL-centric dynamic subframe type, a bi-directional dynamic subframe type, a full-duplex dynamic subframe type, a dynamic switch dynamic subframe type, a mixed interference measurement dynamic subframe type, or a distributed scheduling dynamic subframe type. The operation(s) at block 1905 may be performed using the wireless communication manager 1320 described with reference to FIG. 1, 13, 14, or 17, or the dynamic subframe type selector 1340 described with reference to FIG. 13 or 14.

At block 1910, the method 1900 may include indicating the dynamic subframe type in a TDD header of the TDD subframe. In some examples, the dynamic subframe type may be indicated within a temporally first symbol period of the TDD subframe. In some examples, indicating the dynamic subframe type may include at least one of: embedding an indication of the dynamic subframe type in a reference signal, transmitting the indication of the dynamic subframe type in a subframe type indicator channel, or transmitting a type of DCI corresponding to the dynamic subframe type. In some examples, indicating the dynamic subframe type may include at least one of broadcasting the dynamic subframe type to UEs associated with a cell, or unicasting the dynamic subframe type to a subset of UEs associated with the cell. In some examples, indicating the dynamic subframe type may include transmitting an indication of the dynamic subframe type within a narrow band of frequencies of a system bandwidth, as described with reference to FIG. 3.

In some cases, the dynamic subframe type may be determined using a combination of the content of the indication (i.e., one or more bits) and any context or mode that has been configured. For example, if the access network device 105 and the UEs in communication with the access network device 105 are configured to support a subset of the dynamic subframe types, and the subset of dynamic subframe types does not change dynamically, the indication of the dynamic subframe type may specify which dynamic subframe type within the subset of dynamic subframe types is in use. In some examples, indicating the dynamic subframe type may include transmitting at least one of: a first bit indicating a UL data transmission direction or a DL data transmission direction, or a second bit indicating a half-duplex data transmission or a full-duplex data transmission, or a combination thereof. The operation(s) at block 1910 may be performed using the wireless communication manager 1320 described with reference to FIG. 1, 13, 14, or 17, or the dynamic subframe type indication manager 1345 described with reference to FIG. 13 or 14.

Thus, the method 1900 may provide for wireless communication. It should be noted that the method 1900 is just one implementation and that the operations of the method 1900 may be rearranged or otherwise modified such that other implementations are possible.

Figure 20:
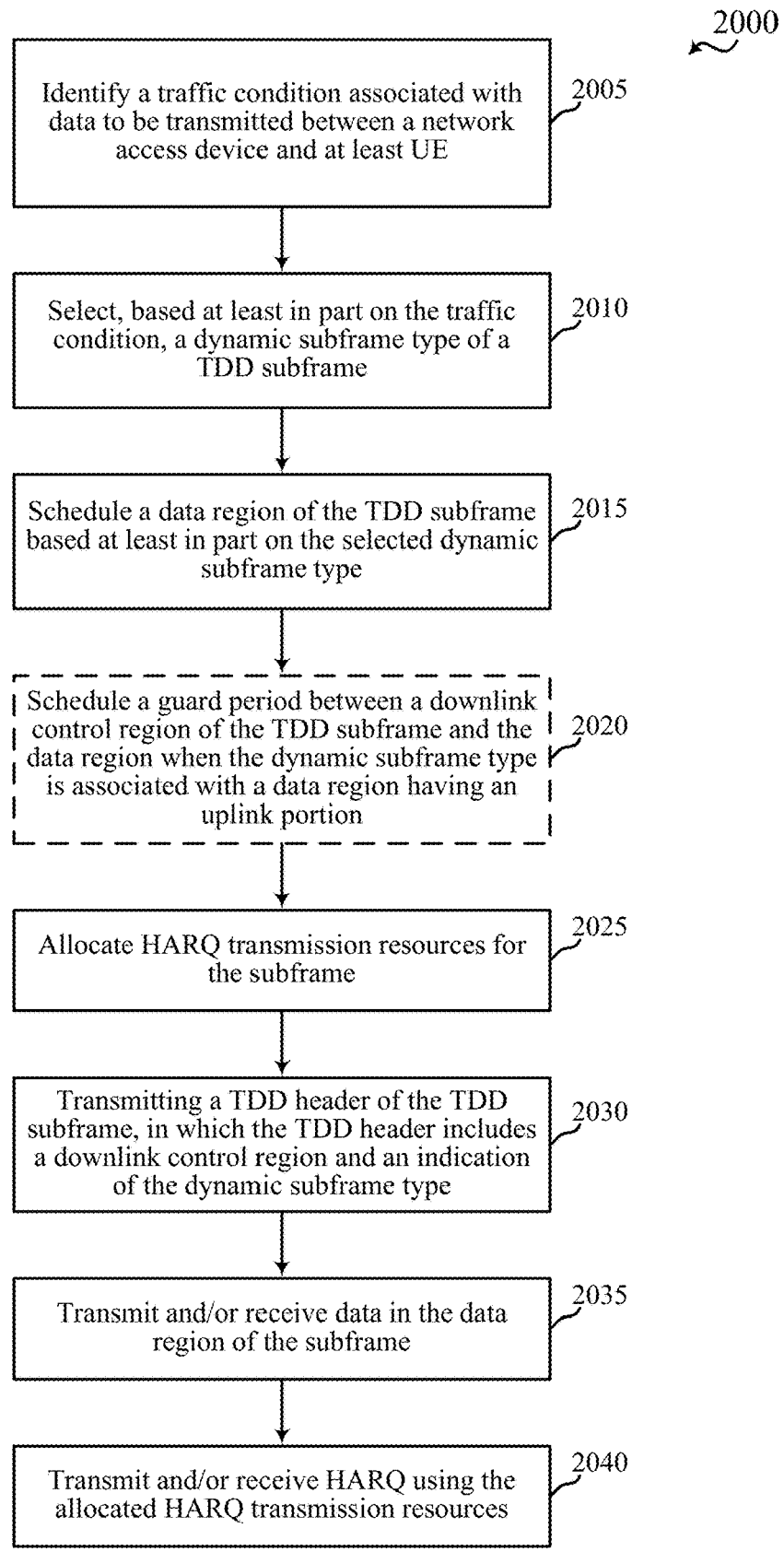
FIG. 20 is a flow chart illustrating an example of a method for wireless communication, in accordance with one or more aspects of the present disclosure.

FIG. 20 is a flow chart illustrating an example of a method 2000 for wireless communication, in accordance with one or more aspects of the present disclosure. For clarity, the method 2000 is described below with reference to aspects of a network access device 105 (e.g., an eNB, an ANC, an RH, or a base station) described with reference to FIG. 1 or 17, or aspects of the apparatus 1305 described with reference to FIG. 13, or aspects of the wireless communication manager 1320 described with reference to FIG. 1, 13, 14, or 17. In some examples, a network access device may execute one or more sets of codes to control the functional elements of the network access device to perform the functions described below. Additionally or alternatively, the network access device may perform one or more of the functions described below using special-purpose hardware.

At block 2005, the method 2000 may include identifying a traffic condition associated with data to be transmitted between a network access device and at least one UE. In some cases, the traffic condition may include a UL/DL traffic ratio. In some examples, the UL/DL traffic ratio may include a ratio of traffic queued for transmission to the network access device and traffic queued for transmission to the at least one UE. The operation(s) at block 2005 may be performed using the wireless communication manager 1320 described with reference to FIG. 1, 13, 14, or 17, or the traffic ratio identifier 1335 described with reference to FIG. 13 or 14.

At block 2010, the method 2000 may include selecting, based at least in part on the traffic condition, a dynamic subframe type of a subframe. In some examples, the dynamic subframe type may be selected from a set of dynamic subframe types including two or more of: a DL-centric dynamic subframe type, a UL-centric dynamic subframe type, a bi-directional dynamic subframe type, or a full-duplex dynamic subframe type. The operation(s) at block 2010 may be performed using the wireless communication manager 1320 described with reference to FIG. 1, 13, 14, or 17, or the dynamic subframe type selector 1340 described with reference to FIG. 13 or 14.

At block 2015, the method 2000 may include scheduling a data region of the TDD subframe based at least in part on the selected dynamic subframe type. The operation(s) at block 2015 may be performed using the wireless communication manager 1320 described with reference to FIG. 1, 13, 14, or 17, or the TDD data region scheduler 1405 described with reference to FIG. 14.

At block 2020, and in some examples in which the selected dynamic subframe type is associated with a data region having a UL portion (which UL portion may in some examples include the entire data region), the method 2000 may include scheduling a guard period between a DL control region of the TDD subframe and the data region. The operation(s) at block 2020 may be performed using the wireless communication manager 1320 described with reference to FIG. 1, 13, 14, or 17, or the guard period scheduler 1410 described with reference to FIG. 14.

At block 2025, the method 2000 may include at least one of: allocating a HARQ transmission period for the TDD subframe at an end of the TDD subframe, allocating at least one HARQ transmission resource for the TDD subframe in a DL control region of a subsequent subframe, or allocating at least one DL HARQ transmission resource for the TDD subframe and at least one UL HARQ transmission resource for the TDD subframe in the TDD subframe. The operation(s) at block 2025 may be performed using the wireless communication manager 1320 described with reference to FIG. 1, 13, 14, or 17, or the HARQ resource allocator 1415 described with reference to FIG. 14.

At block 2030, the method 2000 may include transmitting a TDD header of the TDD subframe. The TDD header may include the DL control region and an indication of the dynamic subframe type. In some examples, the indication of the dynamic subframe type may be transmitted in the DL control region. In some examples, the DL control region may be transmitted within a temporally first symbol period of the TDD subframe, or within the temporally first symbol period of the TDD subframe and a temporally second symbol period of the TDD subframe. In some examples, the dynamic subframe type may be indicated within the temporally first symbol period of the TDD subframe. In some examples, indicating the dynamic subframe type may include at least one of: embedding an indication of the dynamic subframe type in a reference signal, transmitting the indication of the dynamic subframe type in a subframe type indicator channel, or transmitting a type of DCI corresponding to the dynamic subframe type.

In some examples, indicating the dynamic subframe type may include at least one of: broadcasting the dynamic subframe type to UEs associated with a cell, or unicasting the dynamic subframe type to a subset of UEs associated with the cell. In some examples, indicating the dynamic subframe type may include transmitting an indication of the dynamic subframe type within a narrow band of frequencies of a system bandwidth, as described with reference to FIG. 3. In some examples, indicating the dynamic subframe type may include transmitting at least one of: a first bit indicating a UL data transmission direction or a DL data transmission direction, or a second bit indicating a half-duplex data transmission or a full-duplex data transmission, or a combination thereof. The operation(s) at block 2030 may be performed using the wireless communication manager 1320 described with reference to FIG. 1, 13, 14, or 17, the TDD header transmission manager 1420 or DL control region transmission manager 1425 described with reference to FIG. 14, or the dynamic subframe type indication manager 1345 described with reference to FIG. 13 or 14.

At block 2035, the method 2000 may include transmitting and/or receiving data in the scheduled data region. The operation(s) at block 2035 may be performed using the wireless communication manager 1320 described with reference to FIG. 1, 13, 14, or 17, or the data transmission/reception manager 1430 described with reference to FIG. 14.

At block 2040, the method 2000 may include transmitting and/or receiving at least one HARQ transmission on a HARQ resource scheduled at block 2025. The operation(s) at block 2040 may be performed using the wireless communication manager 1320 described with reference to FIG. 1, 13, 14, or 17, or the HARQ manager 1435 described with reference to FIG. 14.

Thus, the method 2000 may provide for wireless communication. It should be noted that the method 2000 is just one implementation and that the operations of the method 2000 may be rearranged or otherwise modified such that other implementations are possible.

Figure 21:
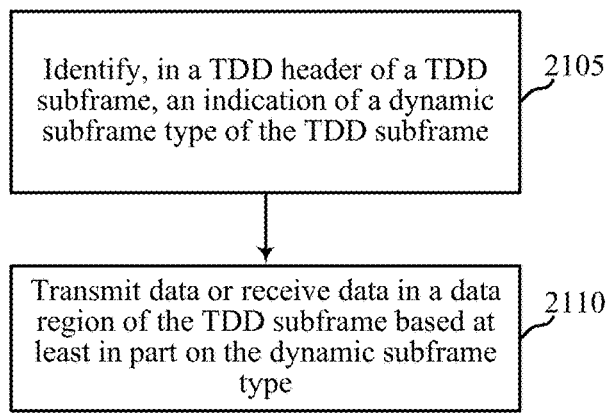
FIG. 21 is a flow chart illustrating an example of a method for wireless communication, in accordance with one or more aspects of the present disclosure.

FIG. 21 is a flow chart illustrating an example of a method 2100 for wireless communication, in accordance with one or more aspects of the present disclosure. For clarity, the method 2100 is described below with reference to aspects of one or more of the UEs 115 described with reference to FIG. 1 or 18, or aspects of the apparatus 1515 described with reference to FIG. 15, or aspects of the wireless communication manager 1520 described with reference to FIG. 1, 15, 16, or 18. In some examples, a wireless device (e.g., a UE, an apparatus, or a wireless communication manager) may execute one or more sets of codes to control the functional elements of the wireless device to perform the functions described below. Additionally or alternatively, the wireless device may perform one or more of the functions described below using special-purpose hardware.

At block 2105, the method 2100 may include identifying, in a TDD header of a subframe, an indication of a dynamic subframe type of the TDD subframe. In some examples, the dynamic subframe type may include: a DL-centric dynamic subframe type, a UL-centric dynamic subframe type, a bi-directional dynamic subframe type, or a full-duplex dynamic subframe type. In some examples, the dynamic subframe type may be identified within a temporally first symbol period of the TDD subframe. In some examples, the dynamic subframe type may be identified based at least in part on at least one of: an indication of the dynamic subframe type embedded in a reference signal, an indication of the dynamic subframe type received in a subframe type indicator channel, or a type of received DCI. In some examples, the dynamic subframe type may be received in at least one of broadcast control information or unicast control information. In some examples, identifying the dynamic subframe type may include identifying an indication of the dynamic subframe type within a narrow band of frequencies of a system bandwidth, as described with reference to FIG. 3. In some examples, identifying the dynamic subframe type may include receiving at least one of: a first bit indicating a UL data transmission direction or a DL data transmission direction, or a second bit indicating a half-duplex data transmission or a full-duplex data transmission, or a combination thereof. The operation(s) at block 2105 may be performed using the wireless communication manager 1520 described with reference to FIG. 1, 15, 16, or 18, or the dynamic subframe type identifier 1535 described with reference to FIG. 15 or 16.

At block 2110, the method 2100 may include transmitting data or receiving data in a data region of the TDD subframe based at least in part on the dynamic subframe type. The operation(s) at block 2110 may be performed using the wireless communication manager 1520 described with reference to FIG. 1, 15, 16, or 18, or the data transmission/reception manager 1540 described with reference to FIG. 15 or 16.

Thus, the method 2100 may provide for wireless communication. It should be noted that the method 2100 is just one implementation and that the operations of the method 2100 may be rearranged or otherwise modified such that other implementations are possible.

Figure 22:
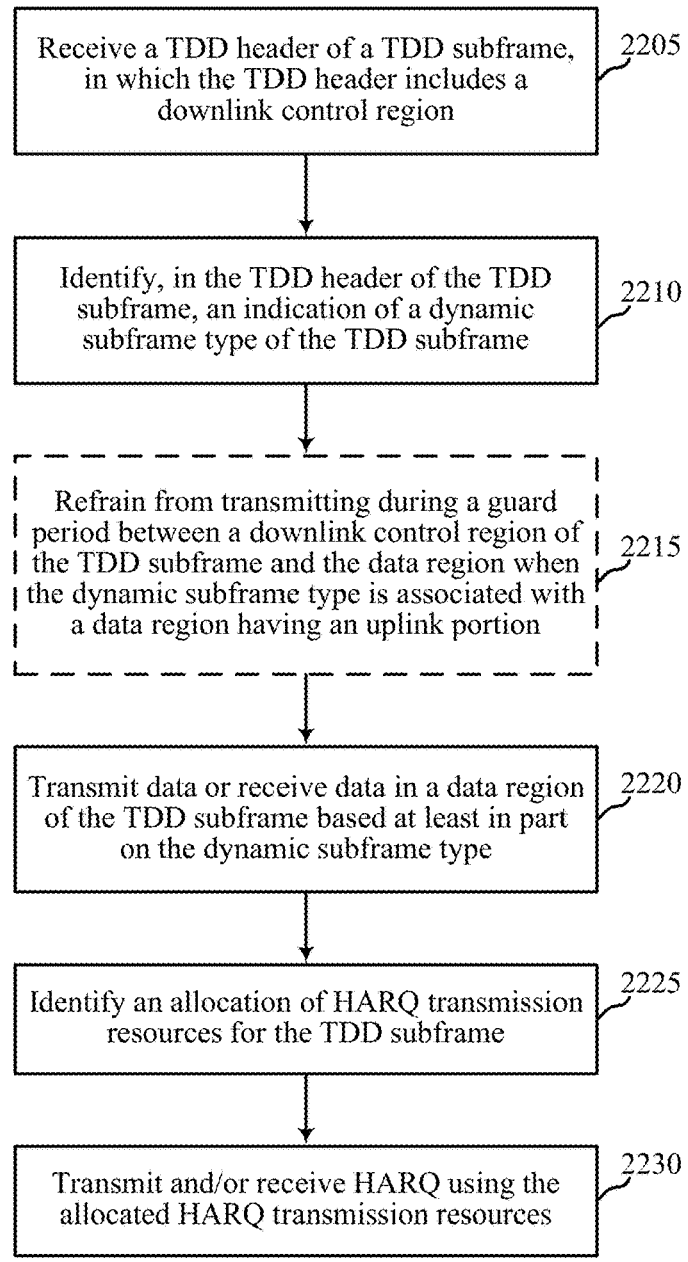
FIG. 22 is a flow chart illustrating an example of a method for wireless communication, in accordance with one or more aspects of the present disclosure.

FIG. 22 is a flow chart illustrating an example of a method 2200 for wireless communication, in accordance with one or more aspects of the present disclosure. For clarity, the method 2200 is described below with reference to aspects of one or more of the UEs 115 described with reference to FIG. 1 or 18, or aspects of the apparatus 1515 described with reference to FIG. 15, or aspects of the wireless communication manager 1520 described with reference to FIG. 1, 15, 16, or 18. In some examples, a wireless device (e.g., a UE, an apparatus, or a wireless communication manager) may execute one or more sets of codes to control the functional elements of the wireless device to perform the functions described below. Additionally or alternatively, the wireless device may perform one or more of the functions described below using special-purpose hardware.

At block 2205, the method 2200 may include receiving a TDD header of a subframe. The TDD header may include a DL control region and an indication of a dynamic subframe type of the TDD subframe. In some examples, the indication of the dynamic subframe type may be received in the DL control region. In some examples, the DL control region may be received within a temporally first symbol period of the TDD subframe, or within the temporally first symbol period of the TDD subframe and a temporally second symbol period of the TDD subframe. The operation(s) at block 2205 may be performed using the wireless communication manager 1520 described with reference to FIG. 1, 15, 16, or 18, or the header processor 1605 described with reference to FIG. 16.

At block 2210, the method 2200 may include identifying, in the TDD header (and in some examples, in the DL control region), the indication of the dynamic subframe type. In some examples, the dynamic subframe type may include: a DL-centric dynamic subframe type, a UL-centric dynamic subframe type, a bi-directional dynamic subframe type, a full-duplex dynamic subframe type, a dynamic switch dynamic subframe type, a mixed interference measurement dynamic subframe type, or a distributed scheduling dynamic subframe type. In some examples, the dynamic subframe type may be identified within a temporally first symbol period of the TDD subframe. In some examples, the dynamic subframe type may be identified based at least in part on at least one of: an indication of the dynamic subframe type embedded in a reference signal, an indication of the dynamic subframe type received in a subframe type indicator channel, or a type of received DCI.

In some examples, the dynamic subframe type may be received in at least one of broadcast control information or unicast control information. In some examples, identifying the dynamic subframe type may include identifying an indication of the dynamic subframe type within a narrow band of frequencies of a system bandwidth, as described with reference to FIG. 3. In some examples, identifying the dynamic subframe type may include receiving at least one of: a first bit indicating a UL data transmission direction or a DL data transmission direction, or a second bit indicating a half-duplex data transmission or a full-duplex data transmission, or a combination thereof. The operation(s) at block 2210 may be performed using the wireless communication manager 1520 described with reference to FIG. 1, 15, 16, or 18, the header processor 1605 described with reference to FIG. 16, or the dynamic subframe type identifier 1535 described with reference to FIG. 15 or 16.

At block 2215, and in some examples in which the identified dynamic subframe type is associated with a data region having a UL portion (which UL portion may in some examples include the entire data region), the method 2200 may include refraining from transmitting during a guard period between the DL control region and the data region. The operation(s) at block 2205 may be performed using the wireless communication manager 1520 described with reference to FIG. 1, 15, 16, or 18, or the guard period manager 1610 described with reference to FIG. 16.

At block 2220, the method 2200 may include transmitting data or receiving data in a data region of the TDD subframe based at least in part on the dynamic subframe type. The operation(s) at block 2220 may be performed using the wireless communication manager 1520 described with reference to FIG. 1, 15, 16, or 18, or the data transmission/reception manager 1540 described with reference to FIG. 15 or 16.

At block 2225, the method 2200 may include identifying at least one of: an allocation of a HARQ transmission period for the TDD subframe at an end of the TDD subframe, an allocation of at least one HARQ transmission resource for the TDD subframe in a DL control region of a subsequent subframe, or an allocation of at least one DL HARQ transmission resource for the TDD subframe and at least one UL HARQ transmission resource for the TDD subframe in the TDD subframe. The operation(s) at block 2225 may be performed using the wireless communication manager 1520 described with reference to FIG. 1, 15, 16, or 18, or the HARQ manager 1615 described with reference to FIG. 16.

At block 2230, the method 2200 may include transmitting and/or receiving at least one HARQ transmission on an allocated HARQ resource. The operation(s) at block 2230 may be performed using the wireless communication manager 1520 described with reference to FIG. 1, 15, 16, or 18, or the HARQ manager 1615 described with reference to FIG. 16.

Thus, the method 2200 may provide for wireless communication. It should be noted that the method 2200 is just one implementation and that the operations of the method 2200 may be rearranged or otherwise modified such that other implementations are possible.

In some examples, aspects from two or more of the methods 1900, 2000, 2100 or 2200 described with reference to FIG. 19, 20, 21 or 22 may be combined. It should be noted that the methods 1900, 2000, 2100 and 2200 are just example implementations, and that the operations of the methods 1900, 2000, 2100 or 2200 may be rearranged or otherwise modified such that other implementations are possible.

Techniques described herein may be used for various wireless communication systems such as CDMA, TDMA, FDMA, OFDMA, single carrier FDMA (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1x, 1x, etc. IS-856 (TIA-856) may be referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C., as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C).

As used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method for wireless communication by a user equipment (UE), comprising:
   identifying, in a time division duplex (TDD) header of a TDD subframe, an indication of a dynamic subframe type of the TDD subframe; and
   transmitting data or receiving data in a data region of the TDD subframe based at least in part on the dynamic subframe type.

2. The method of claim 1, wherein the dynamic subframe type is identified within a temporally first symbol period of the TDD subframe.

3. The method of claim 2, further comprising:
   receiving a downlink control region of the TDD header within at least one of: the temporally first symbol period of the TDD subframe, or the temporally first symbol period of the TDD subframe and a temporally second symbol period of the TDD subframe.

4. The method of claim 1, wherein the dynamic subframe type comprises: a downlink-centric dynamic subframe type, or an uplink-centric dynamic subframe type, or a bi-directional dynamic subframe type, or a full-duplex dynamic subframe type, or a dynamic switch dynamic subframe type, or a mixed interference measurement dynamic subframe type, or a distributed scheduling dynamic subframe type.

5. The method of claim 1, further comprising:
   identifying at least one of: an allocation of a hybrid automatic repeat request (HARQ) transmission period for the TDD subframe at an end of the TDD subframe, or an allocation of at least one HARQ transmission resource for the TDD subframe in a downlink control region of a subsequent subframe, or an allocation of at least one downlink HARQ transmission resource for the TDD subframe and at least one uplink HARQ transmission resource for the TDD subframe in the TDD subframe.

6. The method of claim 1, wherein the dynamic subframe type is received in at least one of: broadcast control information, or unicast control information.

7. The method of claim 1, further comprising:
   identifying the dynamic subframe type in a downlink control region of the TDD subframe; and
   refraining from transmitting during a guard period between the downlink control region and the data region when the dynamic subframe type is associated with the data region having an uplink portion.

8. The method of claim 1, wherein identifying the dynamic subframe type comprises:
   identifying an indication of the dynamic subframe type within a narrow band of frequencies of a system bandwidth.

9. The method of claim 1, wherein identifying the dynamic subframe type comprises:
   receiving at least one of: a first bit indicating an uplink data transmission direction or a downlink data transmission direction, or a second bit indicating a half-duplex data transmission or a full-duplex data transmission, or a combination thereof.

10. The method of claim 1, wherein the dynamic subframe type is identified based at least in part on at least one of: an indication of the dynamic subframe type embedded in a reference signal, or an indication of the dynamic subframe type received in a subframe type indicator channel, or a type of received downlink control information (DCI).

11. The method of claim 1, wherein the dynamic subframe type comprises at least one uplink data symbol and at least one downlink data symbol, wherein each of the at least one uplink data symbol and the at least one downlink data symbol is outside of a downlink control region within the TDD subframe.

12. An apparatus for wireless communication by a user equipment (UE), comprising:
   means for identifying, in a time division duplex (TDD) header of a TDD subframe, an indication of a dynamic subframe type of the TDD subframe; and
   means for transmitting data or receiving data in a data region of the TDD subframe based at least in part on the dynamic subframe type.

13. The apparatus of claim 12, wherein the dynamic subframe type is identified within a temporally first symbol period of the TDD subframe.

14. The apparatus of claim 13, further comprising:
   means for receiving a downlink control region of the TDD header within at least one of: the temporally first symbol period of the TDD subframe, or the temporally first symbol period of the TDD subframe and a temporally second symbol period of the TDD subframe.

15. The apparatus of claim 12, wherein the dynamic subframe type comprises: a downlink-centric dynamic subframe type, or an uplink-centric dynamic subframe type, or a bi-directional dynamic subframe type, or a full-duplex dynamic subframe type, or a dynamic switch dynamic subframe type, or a mixed interference measurement dynamic subframe type, or a distributed scheduling dynamic subframe type.

16. The apparatus of claim 12, further comprising:
   means for identifying at least one of: an allocation of a hybrid automatic repeat request (HARQ) transmission period for the TDD subframe at an end of the TDD subframe, or an allocation of at least one HARQ transmission resource for the TDD subframe in a downlink control region of a subsequent subframe, or an allocation of at least one downlink HARQ transmission resource for the TDD subframe and at least one uplink HARQ transmission resource for the TDD subframe in the TDD subframe.

17. The apparatus of claim 12, wherein the dynamic subframe type is received in at least one of: broadcast control information, or unicast control information.

18. The apparatus of claim 12, further comprising:
   means for identifying the dynamic subframe type in a downlink control region of the TDD subframe; and
   means for refraining from transmitting during a guard period between the downlink control region and the data region when the dynamic subframe type is associated with the data region having an uplink portion.

19. The apparatus of claim 12, wherein the means for identifying the dynamic subframe type comprises:
means for identifying an indication of the dynamic subframe type within a narrow band of frequencies of a system bandwidth.

20. The apparatus of claim 12, wherein the means for identifying the dynamic subframe type comprises:
means for receiving at least one of: a first bit indicating an uplink data transmission direction or a downlink data transmission direction, or a second bit indicating a half-duplex data transmission or a full-duplex data transmission, or a combination thereof.

21. The apparatus of claim 12, wherein the dynamic subframe type is identified based at least in part on at least one of: an indication of the dynamic subframe type embedded in a reference signal, or an indication of the dynamic subframe type received in a subframe type indicator channel, or a type of received downlink control information (DCI).

22. An apparatus for wireless communication by a user equipment (UE), comprising:
one or more memories storing processor-executable code; and
one or more processors coupled with the one or more memories and individually or collectively operable to execute the code to cause the apparatus to:
identify, in a time division duplex (TDD) header of a TDD subframe, an indication of a dynamic subframe type of the TDD subframe; and
transmit data or receiving data in a data region of the TDD subframe based at least in part on the dynamic subframe type.

23. The apparatus of claim 22, wherein the dynamic subframe type is identified within a temporally first symbol period of the TDD subframe.

24. The apparatus of claim 22, wherein the dynamic subframe type comprises: a downlink-centric dynamic subframe type, or an uplink-centric dynamic subframe type, or a bi-directional dynamic subframe type, or a full-duplex dynamic subframe type, or a dynamic switch dynamic subframe type, or a mixed interference measurement dynamic subframe type, or a distributed scheduling dynamic subframe type.

25. The apparatus of claim 22, wherein the one or more processors are individually or collectively further operable to execute the code to cause the apparatus to:
identify at least one of: an allocation of a hybrid automatic repeat request (HARQ) transmission period for the TDD subframe at an end of the TDD subframe, or an allocation of at least one HARQ transmission resource for the TDD subframe in a downlink control region of a subsequent subframe, or an allocation of at least one downlink HARQ transmission resource for the TDD subframe and at least one uplink HARQ transmission resource for the TDD subframe in the TDD subframe.

26. The apparatus of claim 22, wherein indicating the dynamic subframe type comprises the one or more processors, individually or collectively, further operable to execute the code to cause the apparatus to:
receive at least one of: a first bit indicating an uplink data transmission direction or a downlink data transmission direction, or a second bit indicating a half-duplex data transmission or a full-duplex data transmission, or a combination thereof.

27. The apparatus of claim 22, wherein the dynamic subframe type is identified based at least in part on at least one of: an indication of the dynamic subframe type embedded in a reference signal, or an indication of the dynamic subframe type received in a subframe type indicator channel, or a type of received downlink control information (DCI).

28. A non-transitory computer-readable medium storing computer-executable code for wireless communication by a user equipment (UE), the code executable by a processor to:
identify, in a time division duplex (TDD) header of a TDD subframe, an indication of a dynamic subframe type of the TDD subframe; and
transmit data or receiving data in a data region of the TDD subframe based at least in part on the dynamic subframe type.

29. The non-transitory computer-readable medium of claim 28, wherein the dynamic subframe type is identified within a temporally first symbol period of the TDD subframe.

30. The non-transitory computer-readable medium of claim 28, wherein the dynamic subframe type comprises: a downlink-centric dynamic subframe type, or an uplink-centric dynamic subframe type, or a bi-directional dynamic subframe type, or a full-duplex dynamic subframe type, or a dynamic switch dynamic subframe type, or a mixed interference measurement dynamic subframe type, or a distributed scheduling dynamic subframe type.

* * * * *